United States Patent
Ford et al.

(10) Patent No.: US 10,872,042 B2
(45) Date of Patent: Dec. 22, 2020

(54) BACKUP SYSTEM WITH MULTIPLE RECOVERY KEYS

(71) Applicant: Apple Inc., Cupertino, CA (US)

(72) Inventors: Michael D. Ford, Menlo Park, CA (US); Jerrold V. Hauck, Windermere, FL (US); Matthew G. Watson, San Francisco, CA (US); Mitchell D. Adler, Los Gatos, CA (US); Dallas B. De Atley, San Francisco, CA (US); James Wilson, San Jose, CA (US)

(73) Assignee: Apple Inc., Cupertino, CA (US)

( * ) Notice: Subject to any disclaimer, the term of this patent is extended or adjusted under 35 U.S.C. 154(b) by 397 days.

(21) Appl. No.: 15/889,192

(22) Filed: Feb. 5, 2018

(65) Prior Publication Data
US 2018/0225226 A1    Aug. 9, 2018

Related U.S. Application Data

(62) Division of application No. 14/871,498, filed on Sep. 30, 2015, now Pat. No. 9,904,629.
(Continued)

(51) Int. Cl.
*H04L 9/08* (2006.01)
*G06F 12/14* (2006.01)
(Continued)

(52) U.S. Cl.
CPC ...... *G06F 12/1408* (2013.01); *G06F 11/1448* (2013.01); *G06F 21/6218* (2013.01);
(Continued)

(58) Field of Classification Search
CPC ......... H04L 9/00; H04L 9/006; H04L 9/0822; H04L 9/0825; H04L 9/088; H04L 9/0891;
(Continued)

(56) References Cited

U.S. PATENT DOCUMENTS

| | | | |
|---|---|---|---|
| 5,757,915 A | 5/1998 | Aucsmith et al. | |
| 6,278,782 B1 * | 8/2001 | Ober | G06F 8/60 380/264 |

(Continued)

FOREIGN PATENT DOCUMENTS

WO    WO-2016/195797 A1    12/2016

OTHER PUBLICATIONS

IOS Security, Apple Inc., May 2012, 20 pages.
International Search Report and Written Opinion from PCT/US2016/025427, dated Jun. 15, 2016, 12 pages.

*Primary Examiner* — Eric W Shepperd
(74) *Attorney, Agent, or Firm* — Morgan, Lewis & Bockius LLP

(57) ABSTRACT

Some embodiments provide, for a particular device in a set of related devices, a method for backing up data synchronized between the set of related devices. The method stores the backup data encrypted with a set of data encryption keys. The method also stores the set of data encryption keys encrypted with a master recovery key. The method also stores several copies of master recovery key data, each copy of the master recovery key data encrypted with a public key of a different one of the related devices. The backup data is only recoverable by accessing a private key of any one of the related devices.

20 Claims, 21 Drawing Sheets

Related U.S. Application Data

(60) Provisional application No. 62/172,128, filed on Jun. 7, 2015, provisional application No. 62/168,894, filed on May 31, 2015.

(51) Int. Cl.
  *G06F 11/14* (2006.01)
  *H04L 9/00* (2006.01)
  *G06F 21/62* (2013.01)

(52) U.S. Cl.
  CPC .............. *H04L 9/006* (2013.01); *H04L 9/088* (2013.01); *H04L 9/0822* (2013.01); *H04L 9/0825* (2013.01); *H04L 9/0894* (2013.01); *H04L 9/0897* (2013.01); *G06F 2201/80* (2013.01); *G06F 2212/1052* (2013.01)

(58) Field of Classification Search
  CPC ....... H04L 9/0894; H04L 9/32; H04L 9/3226; G06F 21/62; G06F 21/6218; G06F 11/1448
  See application file for complete search history.

(56) References Cited

U.S. PATENT DOCUMENTS

| | | | |
|---|---|---|---|
| 7,568,124 B2 | 7/2009 | Ali et al. | |
| 7,885,925 B1 | 2/2011 | Strong et al. | |
| 7,958,349 B2 | 6/2011 | Parkinson | |
| 8,006,280 B1 | 8/2011 | Hildebrand et al. | |
| 8,209,540 B2 | 6/2012 | Brouwer et al. | |
| 8,359,273 B2 | 1/2013 | Leleu | |
| 8,423,780 B2 | 4/2013 | Plotkin et al. | |
| 8,429,425 B2 | 4/2013 | Ko et al. | |
| 8,825,999 B2 | 9/2014 | Mohamed | |
| 8,850,140 B2 | 9/2014 | De Atley et al. | |
| 9,288,208 B1* | 3/2016 | Roth | H04L 63/0884 |
| 2004/0228493 A1* | 11/2004 | Ma | G06F 21/64 380/286 |
| 2005/0138374 A1* | 6/2005 | Zheng | H04L 9/0894 713/166 |
| 2007/0100913 A1* | 5/2007 | Sumner | G06F 21/6227 |
| 2007/0271234 A1 | 11/2007 | Ravikiran | |
| 2008/0168526 A1 | 7/2008 | Robbin et al. | |
| 2008/0307020 A1* | 12/2008 | Ko | G06F 11/1469 |
| 2009/0016534 A1 | 1/2009 | Ortiz Cornet et al. | |
| 2009/0055464 A1 | 2/2009 | Multer et al. | |
| 2009/0125570 A1 | 5/2009 | Bailey et al. | |
| 2010/0287609 A1 | 11/2010 | Gonzalez et al. | |
| 2010/0293600 A1* | 11/2010 | Schechter | G06F 21/31 726/4 |
| 2010/0318812 A1* | 12/2010 | Auradkar | H04L 9/3073 713/193 |
| 2011/0026714 A1 | 2/2011 | Thomas et al. | |
| 2011/0072274 A1 | 3/2011 | Leoutsarakos et al. | |
| 2011/0252233 A1* | 10/2011 | De Atley | H04L 9/0894 713/165 |
| 2011/0252243 A1 | 10/2011 | Brouwer et al. | |
| 2012/0297189 A1 | 11/2012 | Hayton et al. | |
| 2013/0034229 A1 | 2/2013 | Sauerwald et al. | |
| 2013/0145447 A1 | 6/2013 | Maron | |
| 2013/0159699 A1* | 6/2013 | Torkkel | H04L 9/0897 713/155 |
| 2014/0092757 A1 | 4/2014 | Xu et al. | |
| 2014/0093084 A1 | 4/2014 | De Atley et al. | |
| 2014/0201137 A1 | 7/2014 | Vibhor et al. | |
| 2014/0281514 A1 | 9/2014 | Erofeev et al. | |
| 2014/0281526 A1 | 9/2014 | Lindteigen et al. | |
| 2014/0281540 A1 | 9/2014 | Brouwer et al. | |
| 2014/0281571 A1 | 9/2014 | Federspiel | |
| 2015/0026125 A1 | 1/2015 | Sharma | |
| 2015/0074409 A1 | 3/2015 | Reid et al. | |
| 2015/0082399 A1 | 3/2015 | Wu et al. | |
| 2015/0127946 A1 | 5/2015 | Miller et al. | |
| 2015/0215398 A1 | 7/2015 | Chang et al. | |
| 2015/0222625 A1 | 8/2015 | Ford et al. | |
| 2015/0248562 A1* | 9/2015 | Brown | G06F 11/1448 713/165 |
| 2016/0277374 A1* | 9/2016 | Reid | H04L 63/101 |

\* cited by examiner

BACKUP SYSTEM WITH MULTIPLE RECOVERY KEYS

CLAIM OF BENEFIT TO PRIOR APPLICATIONS

This application is a divisional application of U.S. patent application Ser. No. 14/871,498, filed Sep. 30, 2015, now published as U.S. Patent Publication 2016/0352518. U.S. patent application Ser. No. 14/871,498 claims priority to U.S. Provisional Patent Application 62/172,128, filed Jun. 7, 2015, and U.S. Provisional Patent Application 62/168,894, filed May 31, 2015. U.S. Patent Publication 2016/0352518 and U.S. Provisional Patent Applications 62/172,128 and 62/168,894 are incorporated herein by reference.

BACKGROUND

Some electronic devices store various types of confidential information such as passwords, account numbers, credit card numbers, etc. This information may be shared with other electronic devices owned by the same user. However, electronic devices are often lost, stolen, or replaced with a newer model. Ideally, a user should be able to install this confidential data on a new device easily. At the same time, however, the confidential data should be stored in such a way that the data is protected from attackers.

BRIEF SUMMARY

Some embodiments provide a method for backing up data synchronized between a set of related devices such that the backup data is only accessible by providing a code associated with one of the devices. Specifically, some embodiments store (i) the set of backup data encrypted with a set of data encryption keys, (ii) the set of data encryption keys encrypted with a master recovery key, and (iii) several copies of master recovery key data. Each of the copies of the master recovery key data is encrypted with a recovery key of a different one of the related devices. Each of the related devices stores its recovery key twice-encrypted on a set of secure servers. The recovery key for each particular device is first encrypted with an escrow key of the particular device, generated based on user-entered data (e.g., a device passcode), to create a recovery object, then the recovery object is encrypted with a key associated with the secure servers to create an escrow object stored with the set of secure servers. In some embodiments, in addition to the encrypted recovery key, the recovery object that is encrypted with the key from the secure servers also includes verification data generated from the escrow key.

In some embodiments, the data being backed up is a set of username/password combinations and/or other confidential data items (e.g., pin numbers, account and credit card numbers, cryptographic keys, etc., and in some cases files or other unformatted data blobs) that are shared among devices associated with an account (e.g., a cloud services account). For example, a user might own a phone, a tablet, one or more desktop or laptop computers, a streaming video set top box, all of which the user associates with a cloud services account. These devices then share the various confidential data items with each other (e.g., passwords to streaming video services, discussion forums, password-protected content, financial institutions, etc., cryptographic keys, account and credit card numbers, and other data items).

Each of the pieces of confidential data is encrypted with a data encryption key (or item key). As such, recovering the stored backup also requires access to the data encryption keys. These are stored in a keybag, along with the backup, that is itself encrypted with a master recovery key. The master recovery key of some embodiments is generated based on random data at the time the backup is created, and is therefore not derivable by an attacker. In addition, in some embodiments, the device that generates the master recovery key and creates the backup does not store the master recovery key or the data with which it is generated.

In order for a device to access the keybag in order to use the backup to restore the confidential data items, several copies of the master recovery key are encrypted with the public keys of the different devices that share some or all of the confidential data items. As part of the data sharing process, the set of related devices share their public keys with each other, and these public keys (which are each part of a separate public/private key pair generated by their respective device) are used to encrypt the master recovery key. As such, any of the devices can decrypt one of the copies of the master recovery key using its own private key, and thereby access the keybag and confidential data items.

However, a new device, or a reformatted device (even if one of the set of related devices) would not have access to the private key of any of the devices. As such, in some embodiments each of the devices also registers its recovery key as a secure object stored with a set of secure servers. Each of the devices uses user-entered data (e.g., a passcode for access to the device) to generate an escrow key, with which the recovery key is encrypted to generate a first secure object (referred to as a recovery object). The recovery object is then encrypted with the public key of the set of secure servers (sent via a secure channel to the device creating the escrow object, in some embodiments) to generate a second secure object (referred to as an escrow object). The escrow object is then sent (e.g., via the secure channel) to the set of secure servers for storage.

When a new device needs to access the backup, the user of the new device provides the user-entered data associated with one of the devices, which allows the new device to generate the escrow private key and the verification data stored in the recovery object, and send this verification data to the set of secure servers (via a secure channel). The set of secure servers uses their private key and the received escrow private key verification data to (i) decrypt the escrow object and (ii) verify that the verification data sent by the new device matches that stored in the recovery object (assuming that the user-entered data was correct). The set of secure servers then allow the transmission of the encrypted recovery key back to the new device, so that the new device can use the private escrow key to decrypt the recovery key and then decrypt one of the copies of the master recovery key stored with the backup.

Each of the escrow objects is protected in some embodiments not only by the two public-private key pairs, but also by an algorithm that prevents repeated attempts to access each of the escrow objects. Specifically, some embodiments allow only a given number of attempts to access each escrow object (e.g., 10, 50, 100, etc.). When a maximum or threshold number of attempts have been made to access one of the secure escrow object without success, the object is locked (for at least an extended period of time).

As each of the escrow objects is stored separately on the secure servers, a request to access one of the objects should identify which of the objects is being accessed. In some embodiments, when a user sets up a new device and creates a passcode for the new device, the device automatically uses a set of heuristics to guess which of the several escrow objects should be accessed, based on which of the established devices (for which escrow objects are stored) would most likely have had the same passcode that was used to set up the new device. For example, some embodiments attempt to determine which device is being replaced by the new device (e.g., based on the device type) and use the escrow object stored by this device. To identify the devices, the user would have already signed the new device into an account that links all of the devices (e.g., a cloud services account). In some embodiments, the new device makes one attempt to access this escrow object with the new password, so long as doing so will not place the escrow object in danger of being locked.

If the automatic recovery attempt fails, in some embodiments the new device presents the user with a list of the established devices for which escrow objects exist, and allows the user to select one of the devices and enter the associated device passcode. The new device then generates the escrow key from this passcode, and transmits this to the secure servers in an attempt to access the recovery key associated with the selected device, and thereby access the master recovery key stored with the backup (and subsequently, the backup keybag encrypted with the master recovery key).

In some embodiments, each of the keys (master recovery key, device recovery key, escrow key, secure server key) is actually a public/private key pair. Each public/private key pair is generated according to a one-way key generation function from a set of data (e.g., random data for the master recovery key or the device recovery keys, user-entered data for the escrow keys). The set of data is used to generate a private key, which in turn is used to generate a public key. The public key is used to encrypt various data (e.g., the keybag encrypted with the public master recovery key, the master recovery key copies encrypted with the public keys of the devices, etc.), while the private key is used to decrypt data encrypted with its corresponding public key. In some embodiments, the encrypted copies of the master recovery key stored with the backup are in fact encrypted copies of the random data (e.g., a string of characters) used to generate the master recovery key, and similarly the escrow object for a particular device is the data from which the device public/private key pair is generated, twice-encrypted. In other embodiments, the stored encrypted data for a particular key pair (e.g., master recovery key, device recovery key) is the private key itself, rather than the data from which the private key is generated.

In some cases, the set of data items synchronized between a set of related devices (e.g., a set of devices associated with a particular account, such as a cloud services account) is broken down into several subsets, with each data item being assigned to one or more such subsets according to a set of criteria (e.g., passwords for different types of applications or websites assigned to different subsets). Each subset of the data items is shared among a subset of the related devices that satisfy various criteria for joining a synchronization sub-group (e.g., having a particular property, or proving ownership of a particular cryptographic secret). In this case, some embodiments enable the user of the devices to create separate backups for each of these subsets of data. The device creating the backup for a particular data subset generates a master recovery key for the backup, then encrypts the master recovery key using the public keys of only the devices that are authorized to share the data subset, rather than all of the devices.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description further describe the embodiments described in the Summary as well as other embodiments. Accordingly, to understand all the embodiments described by this document, a full review of the Summary, the Detailed Description, and the Drawings is needed. Moreover, the claimed subject matters are not to be limited by the illustrative details in the Summary, the Detailed Description, and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a method for backing up data synchronized between a set of related devices such that the backup data is only accessible by providing a code associated with one of the devices. Specifically, some embodiments store (i) the set of backup data encrypted with a set of data encryption keys, (ii) the set of data encryption keys encrypted with a master recovery key, and (iii) several copies of master recovery key data. Each of the copies of the master recovery key data is encrypted with a recovery key of a different one of the related devices. Each of the related devices stores its recovery key twice-encrypted on a set of secure servers. The recovery key for each particular device is first encrypted with an escrow key of the particular device, generated based on user-entered data (e.g., a device passcode), to create a recovery object, then the recovery object is encrypted with a key associated with the secure servers to create an escrow object stored with the set of secure servers. In some embodiments, in addition to the encrypted recovery key, the recovery object that is encrypted with the key from the secure servers also includes verification data generated from the escrow key.

Figure 1:
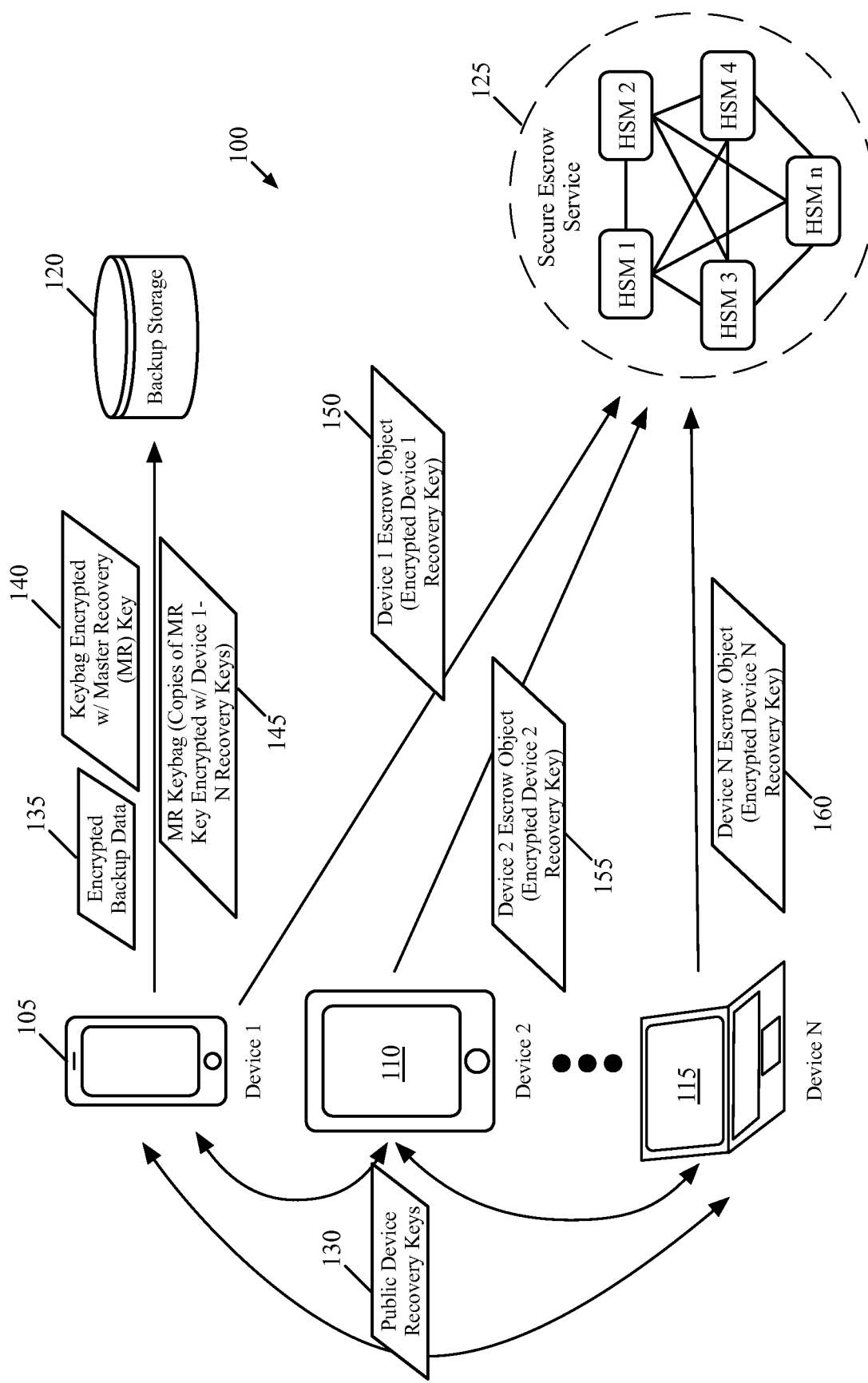
FIG. 1 illustrates a backup system of some embodiments.

FIG. 1 illustrates such a backup system 100 of some embodiments. The backup system 100 includes a set of devices 105-115, a backup storage 120, and a secure escrow service 125 (a set of secure servers). The devices 105-115 may include any number of devices (here, N devices), which are related to each other in that they share data with each other. For instance, these devices may all be associated with a cloud services account of a particular user. As an example, the user might own a phone 105, a tablet 110, a streaming video set top box, one or more desktop or laptop computers (including laptop 115), etc., and associate all of these devices with a cloud services account. These devices then share various confidential data items of the user with each other (e.g., passwords to streaming video services, discussion forums, financial institutions, etc., as well as potentially other confidential data such as cryptographic keys, account numbers, files or other blobs of data, etc.). In addition, as part of the data synchronization system, these devices 105-115 share their respective public keys 130 with each other. That is, Device 1 105 shares its public key with Devices 2-N, Device 2 110 shares its public key with Device 1 and Devices 3-N, etc. These keys are used (as described below) in the creation of a recoverable backup for the confidential data items.

The system 100 also includes a backup storage 120. The backup storage 120 may be a local storage of the user (e.g., an external hard drive designed for backing up data) or a remote storage (e.g., a cloud storage). For example, in some embodiments the backup storage is located on a cloud storage that is part of the cloud services account that relates the various devices 105-115 of the user.

In addition, the system 100 includes the secure escrow service 125. In some embodiments, the secure escrow service 125 includes a set of highly secure hardware security modules (HSMs). These HSMs, in some embodiments, are located in a secure and controlled environment, and each of the HSMs is a physical device capable of performing asymmetric cryptography with its own public/private key pair. In some embodiments, the secure escrow service 125 also includes a set of proxy servers (not shown), which are used to store data for the HSMs. This way, the HSMs, for which storage is expensive, do not need to store the actual recovery objects when a user is not attempting to retrieve one of these objects. The HSMs and secure escrow service are described in greater detail in U.S. Patent Publication 2014/0093084, which is incorporated herein by reference.

As shown, at the time a backup of the confidential data items is created, the backup creating device (in this case, the first device 105) stores (i) encrypted backup data 135, (ii) a keybag 140 (storing a set of data encryption keys that can be used to decrypt the encrypted backup data 135) encrypted with a master recovery key, and (iii) N copies of the master recovery keybag 145, each of which is encrypted with a different one of the public device recovery keys 130.

As mentioned above, the encrypted backup data 135 may include various pieces of confidential data, including various usernames and passwords, account numbers, cryptographic keys and/or seeds from which such keys can be generated, and even files (photos, documents, etc.) that the user wishes to securely back up. Some embodiments encrypt each data item (e.g., each password, each username/password combination, each cryptographic key, etc.) with the public key of a separate item key pair (also referred to as a data encryption key pair).

The private keys of these item key pairs are then stored in the keybag 140, which is collectively encrypted with the master recovery key. The master recovery key of some embodiments is generated based on random data at the time the backup is created, and is therefore not derivable by an attacker. In addition, in some embodiments, the device that generates the master recovery key and creates the backup does not store the master recovery key or the data with which it is generated, such that the master recovery key is only recoverable via the master recovery keybag 145. In addition, though referred to here as a keybag, in some embodiments each differently encrypted copy of the master recovery key is assigned a separate entry in the backup storage 120 and therefore can be separately requested by a recovering device (e.g., one of the devices 1-N or a new device attempting to recover all of the data).

However, a new device, or a reformatted device (even if one of the set of related devices) would not have access to the private key of any of the devices. As such, in some embodiments each of the devices also registers its recovery key as a secure object 150-160 stored with the set of secure servers 125. Each of the devices uses user-entered data (e.g., a passcode for access to the device) to generate an escrow key, with which the recovery key is encrypted in order to generate a first secure object (referred to as a recovery object). In some embodiments, this recovery object also stores verification data generated in a deterministic manner from the private escrow key. The recovery object is then encrypted with the public key of the set of secure servers (sent via a secure channel to the device creating the escrow object, in some embodiments) to generate a second secure object (referred to as the escrow object). The escrow object 150-160 is then sent (e.g., via the secure channel) to the set of secure servers for storage.

Figure 2:
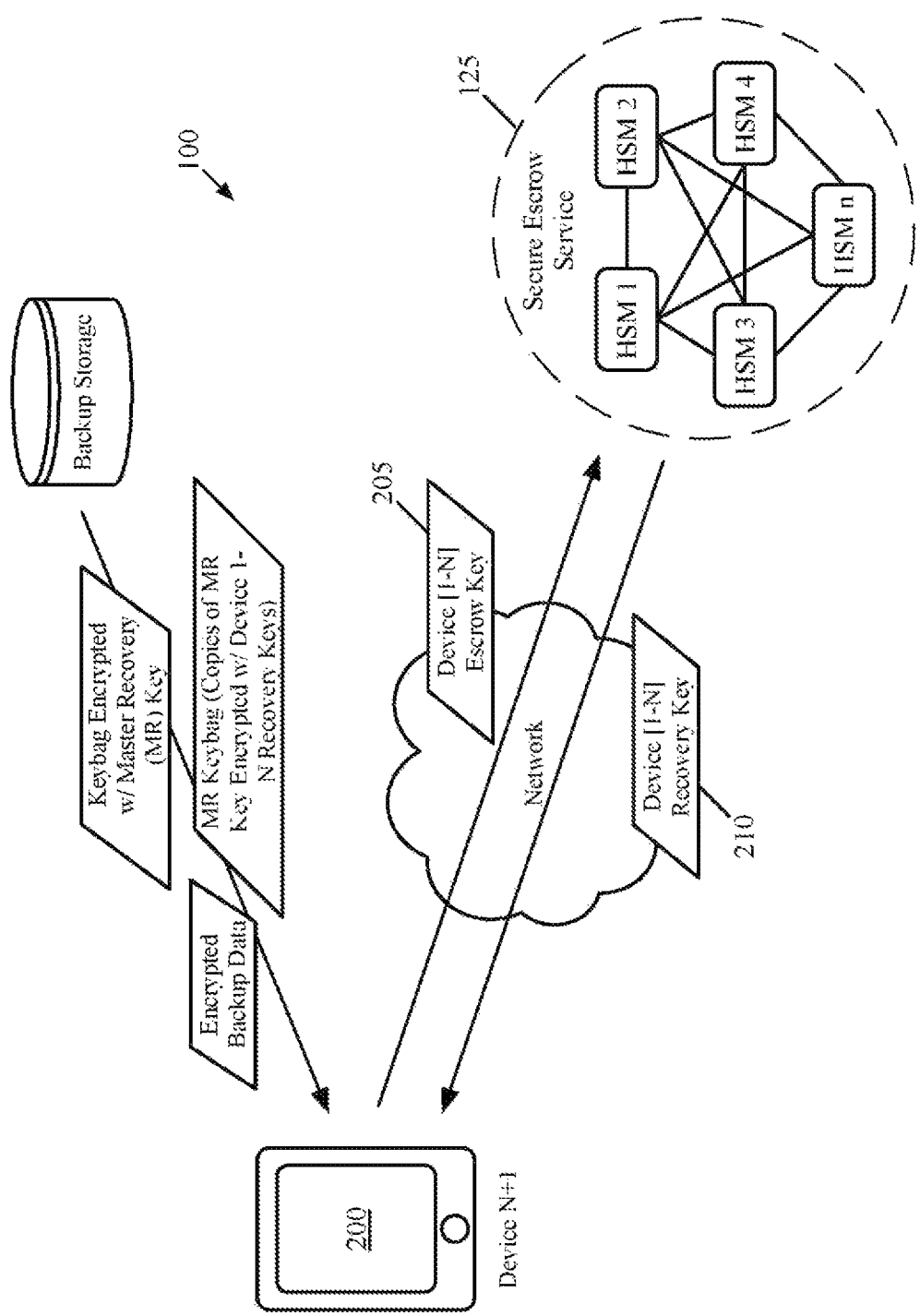
FIG. 2 illustrates the backup system with a new device recovering the backup so that it can install the confidential data items.

FIG. 2 illustrates the backup system 100, with a new device 200 recovering the backup so that it can install the confidential data items. The new device 200 could be a brand new device to the user (i.e., a different physical device than any of devices 1-N), or one of devices 1-N after re-installation of the operating system or wiping of the device memory. When a device has its memory wiped, it loses its device key pair that was used to join the synchronization group and to encrypt one of the copies of the master recovery keybag.

The new device 200, in order to access the stored backup and restore the confidential data items that the first device 105 stored into the protected backup, sends the escrow key 205 for one of the devices 105-115 to the set of secure servers. In order to generate this escrow key 205, the user of the new device 200 provides the user-entered data associated with one of the established devices (e.g., the passcode of one of the devices 105-115), which allows the new device to generate the escrow private key and verification data from the escrow private key, and send this verification data to the set of secure servers (via a secure channel). The set of secure servers uses their private key and the received escrow private key verification data to (i) decrypt the escrow object and (ii) verify that the verification data sent by the new device matches that stored in the recovery object (assuming the user-entered data was correct). The set of secure servers then transmits the recovery key 210 (still encrypted with the private escrow key, in some embodiments) to the new device, so that the new device can use the private escrow key to decrypt the recovery key and then decrypt one of the copies of the master recovery key stored with the backup.

In some embodiments, the device 200 sets up the secure channel with the secure escrow service 125, then sends a request for a specific one of the escrow objects to which the user-entered data corresponds. The HSM to which the particular escrow object is registered retrieves the escrow object from the proxy storage (not shown, as mentioned above), and verifies that the received escrow key verification data is correct. The HSM then sends the recovery key 210 to the new device 200 via the secure channel. In some embodiments, each of the escrow objects is protected in some embodiments not only by the two key pairs, but also by an algorithm that prevents repeated attempts to access each of the escrow objects. Specifically, some embodiments allow only a given number of attempts to access each escrow object (e.g., 10, 50, 100, etc.). When the maximum number of attempts have been made to access one of the secure escrow object without success, the object is locked (for at least an extended period of time, if not permanently).

Figure 3:
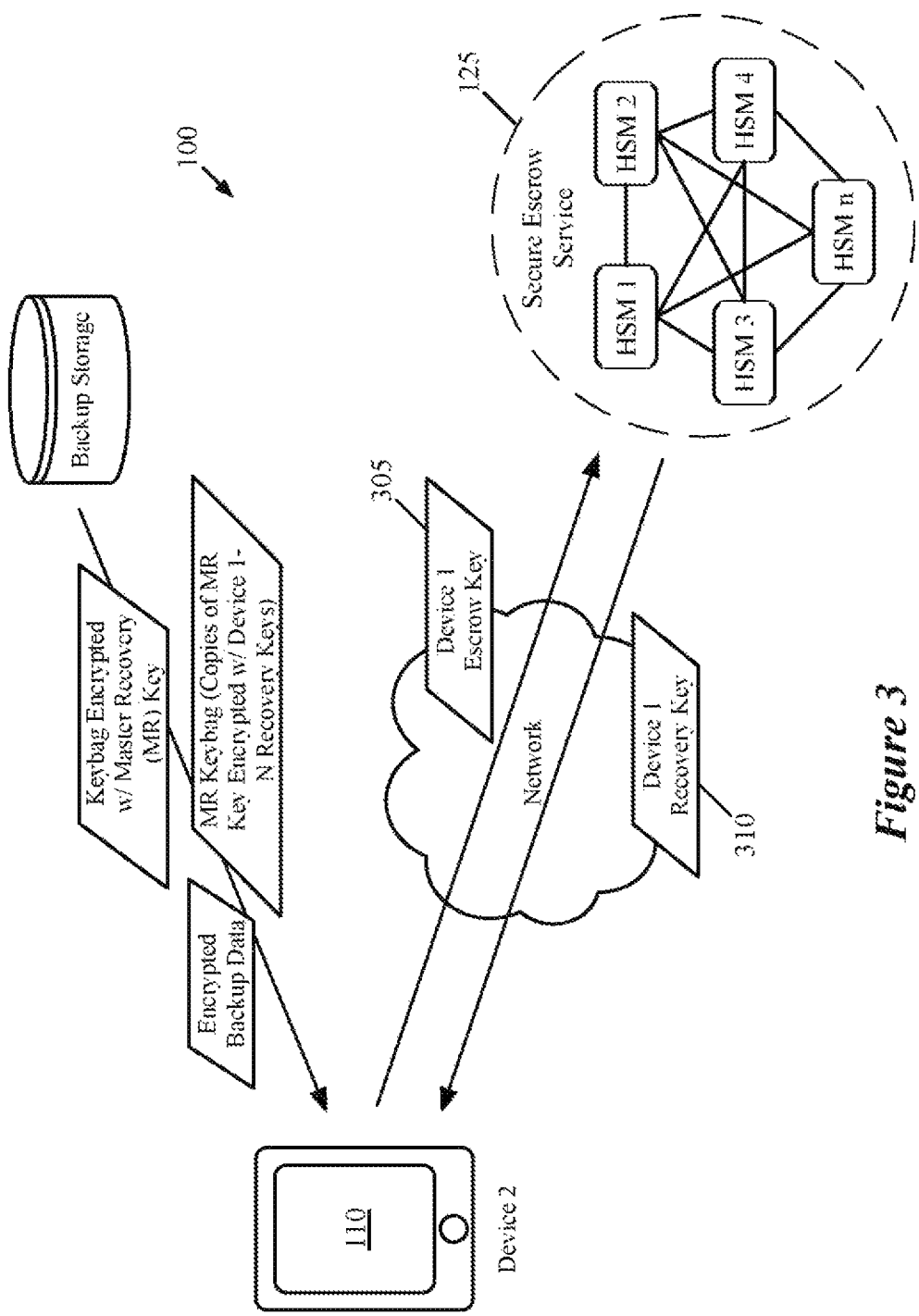
FIG. 3 illustrates the recovery of the backup created by a first device, by a second device, using the escrow record stored with the secure escrow service by the first device.

As noted, in some embodiments the user may wipe one of her devices. If performing backup recovery after doing so, the device will have lost its public/private key pair used for accessing the master recovery key, and therefore can only access the encrypted backup data by successfully accessing one of the master recovery keys. This reformatted device need not access the escrow record that its previous incarnation registered with the escrow service; in fact, if the user did not passcode-protect the device, then no escrow record may be registered for the device. FIG. 3 illustrates the recovery of the backup created by device 105 by the second device 110, using the escrow record stored with the secure escrow service 125 by the first device 105. Specifically, as shown, the second device 110 sends the escrow key 305 (e.g., the verification data generated from this escrow key) associated with device 115 (after receiving the user-entered data associated with the first device), and receives the recovery key 310 for the first device, which it can then use to recover the backup in the same manner as the new device 200.

As mentioned, the request to access one of the escrow objects identifies which of the objects is being accessed. In some embodiments, when the user sets up the new device and creates a passcode for the new device, the device automatically uses a set of heuristics to guess which of the several escrow objects should be accessed, based on which of the established devices (for which escrow objects are stored) would most likely have had the same passcode that was used to set up the new device. For example, some embodiments attempt to determine which device is being replaced by the new device (e.g., based on the device type) and use the escrow object stored by this device. In the example, the new device 200 is a tablet, and might be replacing the second device 110, and therefore the new device 200 would make an attempt to access the escrow object 155 using the escrow key generated from the passcode the user sets up for the new device 200. In some embodiments, the new device makes one attempt to access this escrow object with the new password, so long as doing so will not place the escrow object in danger of being locked.

If the automatic recovery attempt fails, in some embodiments the new device presents the user with a list of the established devices for which escrow objects exist, and allows the user to select one of the devices and enter the associated device passcode. The new device then generates the escrow key from this passcode, and transmits this to the secure servers in an attempt to access the recovery key associated with the selected device, and thereby access the master recovery key stored with the backup (and subsequently, the backup keybag encrypted with the master recovery key).

In some embodiments, any device can access the backup storage 120 to request the encrypted backup data 135, the keybag encrypted with the master recovery key 140, and the master recovery keybag 145 (or one of the entries therein), as the device will not be able to recover the data without the recovery key 210 (or one of the other recovery keys) anyway. Some embodiments, however, restrict access to the backups to devices that are at least registered with the same cloud services account as the device that created the backup. Once the new device receives the recovery key 210 from the secure escrow service 125, the device can decrypt one of the copies of the master recovery key (the version encrypted with the public key of the device whose private key the new device 200 received from the secure escrow service), then use the master recovery key to decrypt the keybag with the keys that enable access to the confidential data.

In some cases, the set of data synchronized between a set of related devices (e.g., a set of devices associated with a particular account, such as a cloud services account) is broken down into several subsets, with each piece of data being assigned to one or more such subsets according to a set of criteria (e.g., passwords for different types of applications or websites assigned to different subsets). Each subset of data is shared among a subset of the related devices that satisfy various criteria for joining a synchronization subgroup (e.g., having a particular property, or proving ownership of a particular cryptographic secret). In this case, some embodiments enable the user of the devices to create separate backups for each of these subsets of data. The device creating the backup for a particular data subset generates a master recovery key for the backup, then encrypts the master recovery key using the public keys of only the devices that are authorized to share the data subset, rather than all of the devices.

One of ordinary skill in the art will recognize that in some embodiments, each of the keys (master recovery key, device recovery key, escrow key, secure server key) is actually a public/private key pair. Each public/private key pair is generated according to a one-way key generation function from a set of data (e.g., random data for the master recovery key or the device recovery keys, user-entered data for the escrow keys). The set of data is used to generate a private key, which in turn is used to generate a public key. The public key is used to encrypt various data (e.g., the keybag encrypted with the public master recovery key, the master recovery key copies encrypted with the public keys of the devices, etc.), while the private key is used to decrypt data encrypted with its corresponding public key. In some embodiments, the encrypted copies of the master recovery key stored with the backup are in fact encrypted copies of the random data (e.g., a string of characters) used to generate the master recovery key, and similarly the escrow object for a particular device is the data from which the device public/private key pair is generated, twice-encrypted. In other embodiments, the stored encrypted data for a particular key pair (e.g., master recovery key, device recovery key) is the private key itself, rather than the data from which the private key is generated.

FIGS. 1 and 2 illustrate an example of the backup system of some embodiments. Several more detailed examples are described below. Section I describes the creation of backup data and escrow records for accessing the backup data, while Section II describes the access of such backup data via the escrow records in some embodiments. Section III then describes creating backups that only a subset of related devices can access. Next, Section IV describes updating previously-created backups. Finally, Section V describes an electronic system with which some embodiments of the invention are implemented.

I. Backup and Escrow Object Creation

As mentioned, to create a backup for a set of confidential data shared among a set of related devices, some embodiments store (i) the set of backup data encrypted with a set of data encryption keys, (ii) the set of data encryption keys encrypted with a master recovery key, and (iii) several copies of master recovery key data, each of which is encrypted with a recovery key of a different one of the related devices. Each of the related devices stores its recovery key twice-encrypted on a set of secure servers, with the recovery key for each particular device first encrypted with an escrow key of the particular device, generated based on user-entered data (e.g., a device passcode), then encrypted with a key associated with the secure servers to create an escrow object stored with the set of secure servers.

Figure 4:
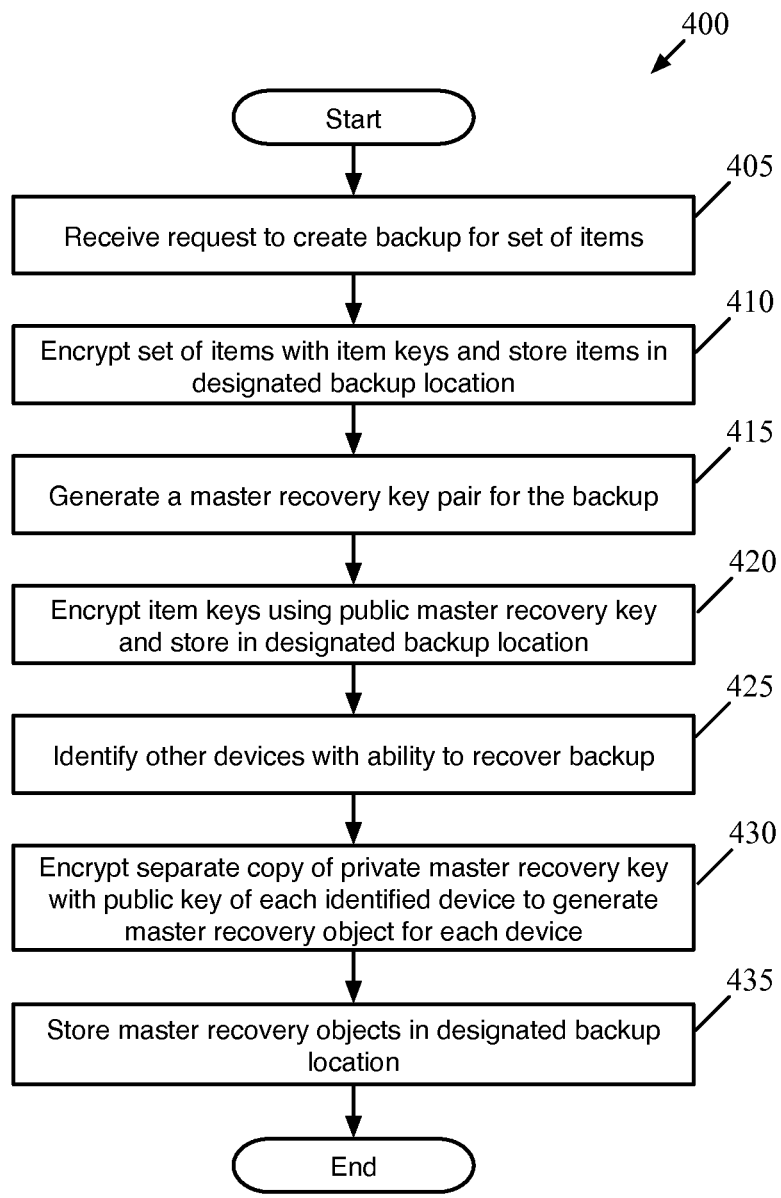
FIG. 4 conceptually illustrates a process of some embodiments for creating a backup for a set of confidential data items shared among multiple associated devices.

FIG. 4 conceptually illustrates a process 400 of some embodiments for creating a backup for a set of confidential data items shared among multiple associated devices (e.g., a set of devices associated with the same cloud services account). In some embodiments, the process 400 is performed automatically on a regular basis by one particular device out of the multiple associated devices, which may be a device automatically selected to perform regular backups, or a device designated by the user. On the other hand, the process 400 could be initiated by user action on the device to create a backup of the shared confidential data outside of a regular schedule in some embodiments. The process 400 will be described in part by reference to FIGS. 5 and 6, which conceptually illustrate the encryption of the keybag and master recovery key according to some embodiments.

As shown, the process 400 begins by receiving (at 405) a request to create a backup for a set of data items. As noted in the previous paragraph, in some embodiments the request is externally generated by user input requesting that a backup be created or from an external server (e.g., a server associated with the cloud services account to which the various devices belong). In other embodiments, the request for creation of a backup is internally generated (e.g., based on a set of conditions being met, or a particular period of time having passed since a most recent backup was created by the device or for one of the associated devices).

The process 400 then encrypts (at 410) a set of items with item keys and stores the encrypted items in a designated backup location. The set of items, as described above, may be a set of usernames and passwords, cryptographic keys or seed data for such keys, files, etc. For example, the encrypted backup data items might include passwords to various user accounts on the web, Wi-Fi networks and passwords, etc. In addition, the cryptographic keys include, in some embodiments, application-specific keys that allow access to application data. These application-specific keys, in some embodiments, are used to access data stored for an application (either a first-party application provided by the device manufacturer or a third-party application) in cloud storage. In some embodiments, the application-specific keys provide access to a hierarchy of keys and data, as described in the U.S. Provisional Patent Applications 62/168,893 and 62/172,127 as well as the concurrently filed U.S. patent application Ser. No. 14/872,013, now published as U.S. Pat. No. 10,198,182 and entitled "Multiple Synchronization Groups Among Devices". The U.S. Provisional Patent Applications 62/168,893 and 62/172,127 as well as the concurrently filed U.S. patent application Ser. No. 14/872, 013 are incorporated by reference herein.

Some embodiments encrypt each of the items with a different key for the backup storage, while other embodiments use the same key for encrypting the various backed-up data items. In addition, some embodiments store the data items on the device in encrypted fashion. In some such embodiments, the data items are encrypted with a different key or set of keys for storage on the device, and are thus decrypted and then re-encrypted with the item keys for storage in the backup location. In other such embodiments, the data items are encrypted with the data item keys for storage on the device, and therefore the encryption of operation 410 actually takes place before the process 400.

The designated backup location, in some embodiments, is a cloud storage of the cloud services account to which the associated devices belong. That is, the device backs up its confidential data items to the cloud storage, while using the secure escrow service to ensure that the backup is not recoverable by an attacker, even if that attacker is the cloud service which also owns the secure escrow service. In other embodiments, the backup storage location may be owned by the user. For instance, the backup storage location could be an external drive designed for storing device backups (e.g., the Apple Time Capsule) or a drive internal to one of the devices.

Next, the process generates (at 415) a master recovery key for the backup. Some embodiments, to generate a master recovery key pair, use a randomly-generated seed data (e.g., a random 128-bit, 256-bit, etc. seed). The randomly-generated seed data of some embodiments is not tied to the device in any identifiable way, and changes depending on the time that the backup is created. From the randomly-generated seed data, some embodiments use a deterministic one-way key generation function to defined a private master recovery key and a public master recovery key.

Figure 5:
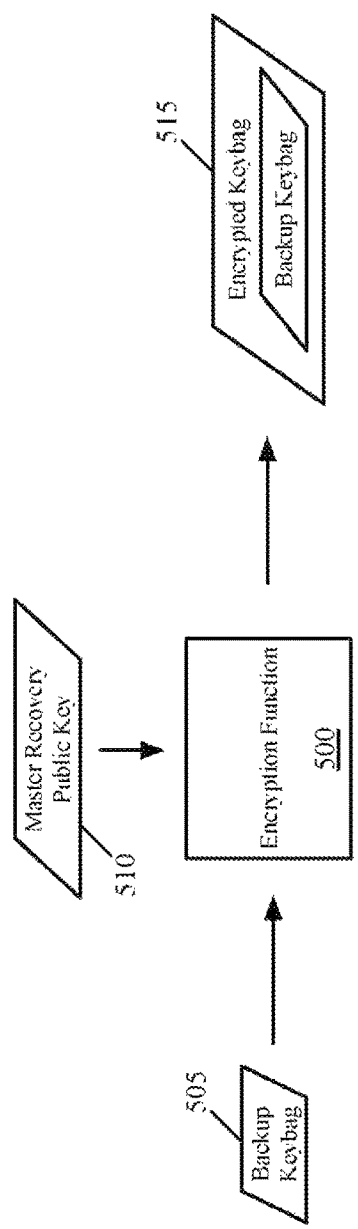
FIG. 5 conceptually illustrates the encryption of a backup keybag that stores item keys according to some embodiments.

The process then encrypts (at 420) the item keys using the public master recovery key and stores the encrypted keybag in the designated backup location. In some embodiments, the item keys are stored in a backup keybag, which is itself encrypted. That is, the item keys are not individually encrypted, but rather the entire keybag storage structure is encrypted via one application of the encryption function. FIG. 5 conceptually illustrates the encryption of the backup keybag that stores the item keys according to some embodiments. As shown, a backup keybag 505 (storing the item keys used to encrypt backup keychain data) is fed into an encryption function 500 that uses a key to perform the encryption. The encryption function 500, in some embodiments, is an asymmetric encryption function, such as Rivest-Shamir-Adleman (RSA) Digital Signature Standard (DSS), elliptic curve encryption, etc. In this case, the encryption function 500 uses the public key 510 of the master recovery key pair to encrypt the backup keybag 505, resulting in an encrypted keybag 515. The backup keybag 505 is shown conceptually inside the encrypted keybag 515, to indicate that removal of the encryption will reveal the backup key bag.

The process 400 then identifies (at 425) the other devices that will be able to recover the backup. In some embodiments, not only the device creating the backup (the device performing the process 400) may recover the data stored in the backup. Specifically, some embodiments create a backup that is accessible by all devices associated with a particular cloud services account. As described below in Section III, some embodiments create backups that are only recoverable by a subset of the devices that meet a particular set of criteria.

Each of the devices that shares synchronization data (and therefore participates in the backup) will have shared the public key of their respective key pairs with the device creating the backup, and therefore the process encrypts (at 430) a separate copy of the private master recovery key (or the randomly-generated seed data for the master recovery key) with the public key of each of the identified devices. This generates a separate master recovery object for each such device. Any of these devices can then use their private key to decrypt their respective master recovery object (once stored in the backup) and thereby use the master recovery key to access the backup data.

Figure 6:
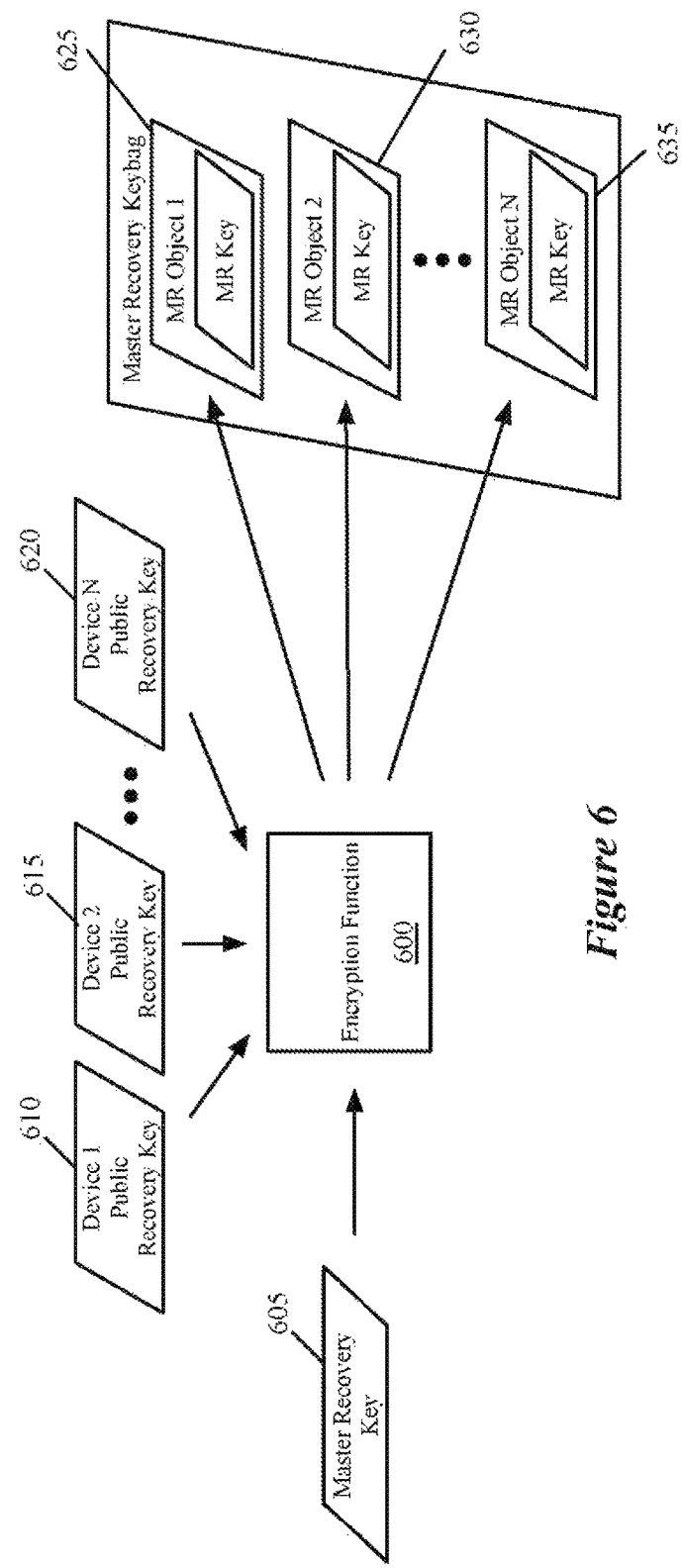
FIG. 6 conceptually illustrates the encryption of a master recovery private key (or randomly-generated seed data) with each of the device public keys according to some embodiments.

FIG. 6 conceptually illustrates the encryption of the master recovery private key (or randomly-generated seed data) with each of the device public keys according to some embodiments. As shown, the master recovery key 605 (representative of either the private master recovery key or the random data from which the private master recovery key can be deterministically generated) is fed into an encryption function 600 that uses a key to perform the encryption. The encryption function 600, in some embodiments, is an asymmetric encryption function, such as RSA, DSS, elliptic curve encryption, etc., and may be the same as the encryption function 500 of FIG. 5. In this case, the encryption function 600 is applied to the master recovery key 605 several times (N times, for N device public keys), each time using a different one of the device keys 610-620. This results in N master recovery objects 625-635, each of which can be decrypted with a different device private key to reveal the master recovery key data 605.

The process 400 then stores (at 435) the master recovery objects in the designated backup location, then ends. In some embodiments, these master recovery objects are stored in a master recovery keybag, while in other embodiments the master recovery objects are stored as separate entries (and thus are separately accessible). In some embodiments, as mentioned, these master recovery objects are stored in the same location as the backup set of data items and backup keybag. This backup location may be a set of cloud storage servers (or generally with a cloud storage service, from the device perspective), an external drive to which the device connects, etc.

Figure 7:
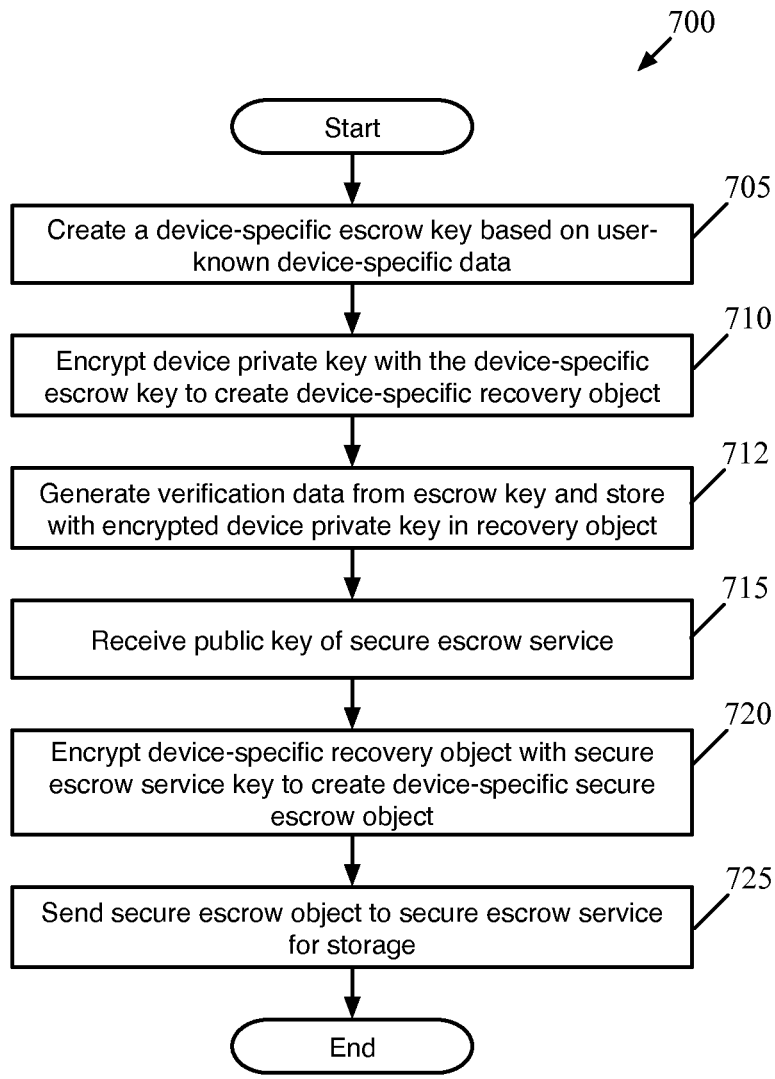
FIG. 7 conceptually illustrates a process of some embodiments for creating a secure escrow object which may be used by a new device to access the private key of one of the devices for which the backup was created, thereby enabling access to the backed up data for the new device.

FIG. 7 conceptually illustrates a process 700 of some embodiments for creating a secure escrow object which may be used by a new device to access the private key of one of the devices for which the backup was created, thereby enabling access to the backed up data for the new device. In some embodiments, the process 700 is performed by any device that accesses a cloud services account for which backups may be created and which is protected by a passcode/password. For instance, even if a backup is created for six devices (i.e., using the public keys of six different devices), if only four of these devices are passcode protected, then only the four devices will create secure escrow objects (the other devices can access the backup using their private key, so long as the private key is not lost (due, e.g., to the device memory being erased). In various embodiments, a device may perform the process 700 or a similar process automatically (e.g., each time a passcode is created or changed for the device) or upon user request. In some cases, a device can create and register a secure escrow object before a backup has even been created for the device to access. The process 700 will be described in part by reference to FIG. 8, which conceptually illustrates the creation of an escrow object according to some embodiments.

Figure 8:
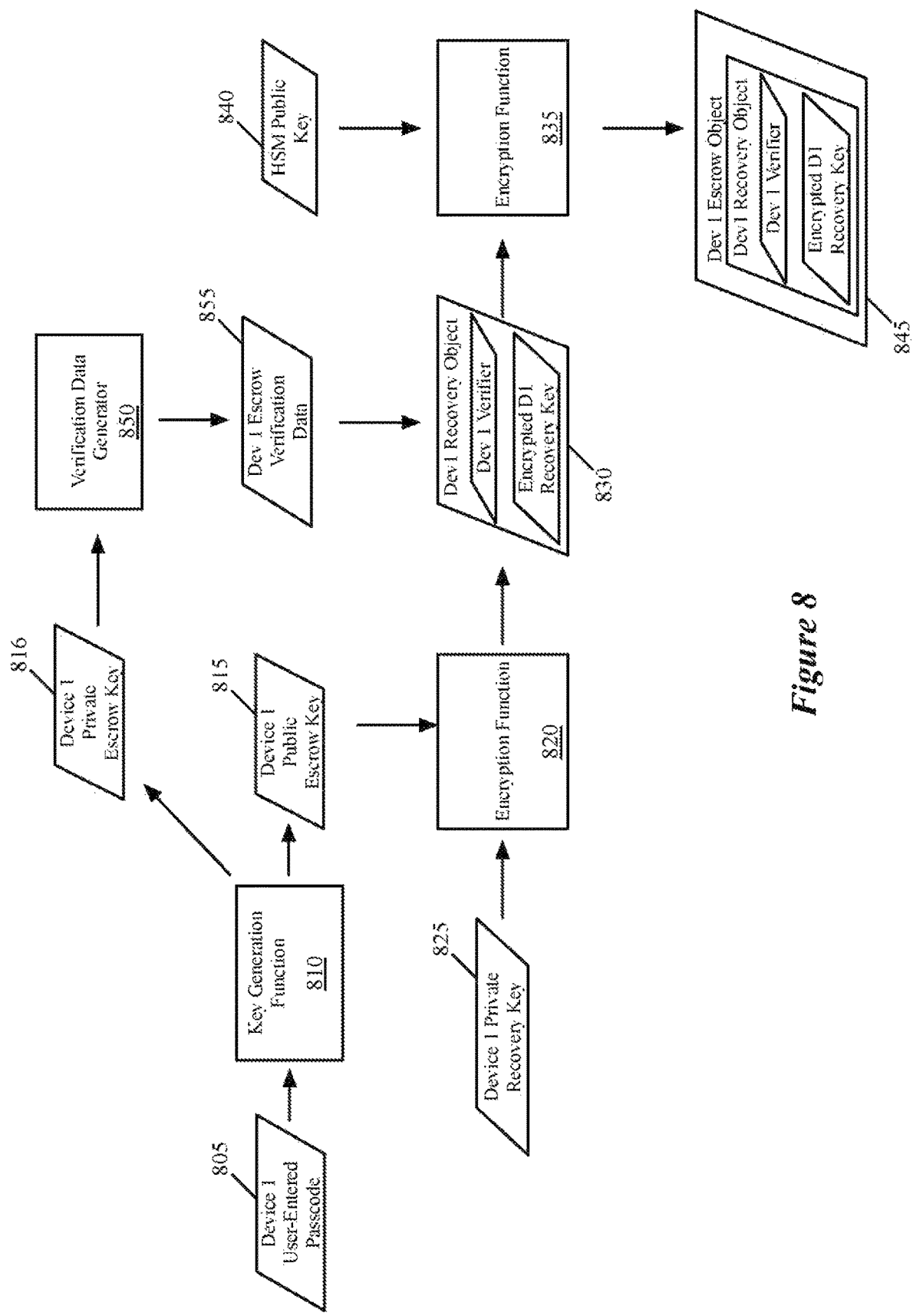
FIG. 8 which conceptually illustrates the creation of an escrow object according to some embodiments.

As shown, the process 700 begins by creating (at 705) a device-specific escrow key based on user-known device-specific data. In some embodiments, the user-known device-specific data is a passcode or password (e.g., the passcode entered by the primary user of a laptop/desktop computer, or the passcode for unlocking a phone or tablet). From the device-specific data, the process deterministically generates a private escrow key and a public escrow key. FIG. 8 shows that, for a particular device, a user-entered passcode 805 is used as input to a key generation function 810, which outputs a public escrow key 815 and a private escrow key 816.

The process then encrypts (at 710) the private key of the device (i.e., the private key of the key pair for which the public key is shared with the other related devices and which is used to encrypt the master recovery key stored with the backup) using the generated escrow key in order to create a device-specific recovery object. As shown in FIG. 8, the public escrow key 815 (the output of the key generation function 810) is used as the key for the encryption function 820, which encrypts the private recovery key 825 (or seed data from which the private recovery key is deterministically generated). The encryption function 820, in some embodiments, is an asymmetric encryption function, such as RSA, DSS, elliptic curve encryption, etc. In some embodiments, the same encryption function is used for encrypting the recovery key as for encrypting the backup keybag and/or encrypting the master recovery key. The output of the encryption function 820 is a recovery object 830 for the particular device, which is the private key wrapped in a first layer of encryption.

Next, the process 700 generates (at 712) verification data from the private escrow key and stores this verification data in the recovery object along with the encrypted device private key. As shown in FIG. 8, the private escrow key 816 (also an output of the key generation function) is used as the input for a verification data generator module 850, which generates escrow key verification data 855. As shown, this escrow key verification data 855 is stored in the recovery object 830 along with the encrypted recovery key 825. In some embodiments, the verification data generator uses a hash function or other deterministic one-way function which, given an input (the private escrow key), will always generate the same output (the verification data), but which cannot be reversed (i.e., the private key cannot be generated from the verification data). This verification data, in some embodiments, is used by the secure escrow service to verify that a new device has possession of the private escrow key before allowing the new device access to the recovery object.

The process 700 also receives (at 715) the public key of the secure escrow service. In some embodiments, the secure escrow service has multiple secure servers, each of which has a different public/private key pair. In this case, the device receives a public key that corresponds to a specific one of the secure servers (or groups of secure servers), and the escrow object is subsequently registered to the specific secure server (or group of secure servers). While shown in the conceptual process 700 as occurring after the creation of the recovery object, one of ordinary skill in the art will recognize that in some embodiments the device will receive the public key from the secure servers well in advance of the creation of the recovery object.

Having received the public key of the secure servers, the process 700 encrypts (at 720) the device-specific recovery object (created at operation 710) using the public key of the secure servers in order to create a device-specific secure escrow object. FIG. 8 illustrates that the recovery object 830 is used as input to an encryption function 835, which uses the HSM public key 840 as the encryption key to encrypt the recovery object 830 and outputs a twice-encrypted escrow object 845. The encryption function 835, in some embodiments, is another call to the same encryption function as 820 (e.g., an asymmetric encryption function, such as RSA, DSS, elliptic curve encryption, etc.). The escrow object 845 is the private recovery key 825 of the device (or seed data for generating the private recovery key) with two layers of encryption, and which requires both (i) the private key of the secure servers and (ii) the private escrow key for decryption.

Having generated the secure escrow object, the process 700 sends (at 725) the secure escrow object to the secure escrow service for storage. In some embodiments, the secure escrow service includes the high-security modules that store their public/private key pair(s), and proxy servers used to store the twice-encrypted escrow objects. The high-security modules perform the decryption of the escrow objects (described below in Section II) and form secure connections with devices attempting to recover the registered private keys, but the proxy servers store the escrow objects and only send the objects to the high-security modules when a user provides the private escrow key verification data and requests the registered private recovery key in return.

Figure 9:
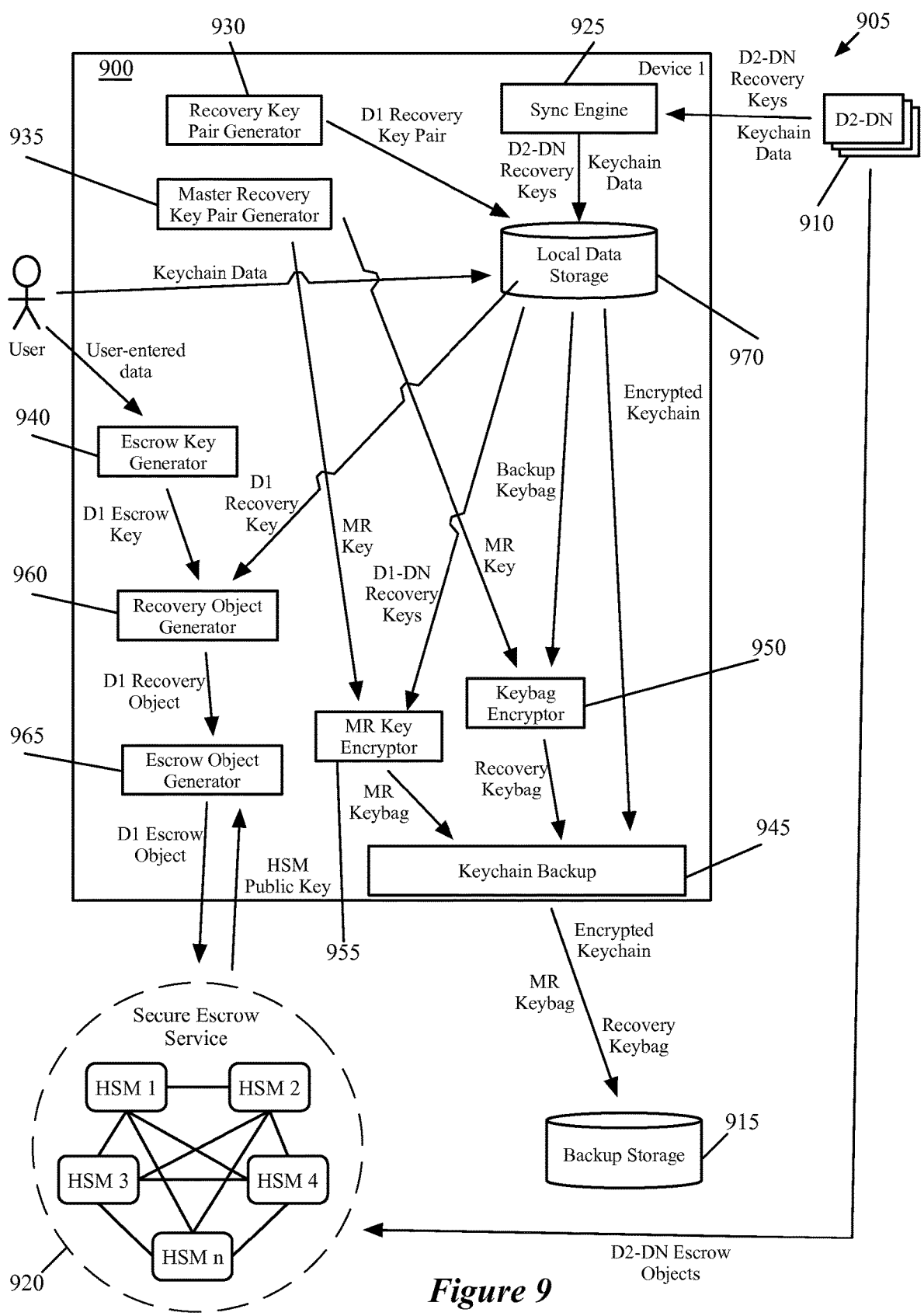
FIG. 9 conceptually illustrates the software architecture of a device in a backup system according to some embodiments.

FIG. 9 conceptually illustrates the software architecture of a device 900 in a backup system 905. The backup system 905 additionally includes additional related devices 910, a backup storage 915, and a secure escrow service 920. As described above, the secure escrow service 920 may include several HSMs that store their public/private key pairs, as well as a set of proxy servers that store escrow objects registered by the devices 900 and 910, as well as escrow objects for other sets of related devices (e.g., thousands or millions of devices). The backup storage 915 may be a network storage in some embodiments, such as a cloud storage owned by the same entity as the secure escrow service 920. In such a case, the various components of the backup (the encrypted keychain, backup keybag, and encrypted master recovery keys) may not be stored on the same physical storage device, but are viewed as stored in the same location by the devices 900 and 910. In other embodiments, the backup storage 915 is a local storage (e.g., a drive external to the devices 900 and 910).

The devices 900 and 910 may be any sort of user device, including smart phones, smart watches, tablets, desktop computers, laptop computers, streaming video set top boxes, media players, etc. This figure shows one of the devices 900 in detail, but the operations shown for this device could be performed by any of the other devices 910 in some embodiments. That is, any of the other devices could create a backup for the set of devices, and at least some of the other devices perform the same operations to generate public/private key pairs and store the private key within an escrow object.

As shown, the device 900 includes a sync engine 925, a recovery key pair generator 930, a master recovery key pair generator 935, an escrow key generator 940, a keychain backup module 945, a keybag encryptor 950, a master recovery key encryptor 955, a recovery object generator 960, and an escrow object generator 965. In some embodiments, the recovery key pair generator 930, master recovery key pair generator 935, and escrow key generator 940 are all separate instances of the same deterministic key generation function, which translates seed data (e.g., randomly generated data, etc.) into a private key and corresponding public key. Some embodiments use cryptographic hash functions for key generation, such as the Secure Hash Algorithm (SHA) family of functions.

In addition, in some embodiments the keybag encryptor 950, master recovery key encryptor 955, recovery object generator 960, and escrow object generator 965 are all separate instances or use separate instances of the same asymmetric encryption function, which uses a public key of a key pair to encrypt data that can be decrypted with the private key of the key pair. As examples, some embodiments use one of RSA, DSS, elliptic curve encryption, etc. The keychain backup module 945, in some embodiments, is responsible for communicating with the backup storage 915 and sending data to the backup storage. The sync engine 925 of some embodiments handles synchronization of keychain data (e.g., passwords, cryptographic keys, etc.) with the other related devices. This synchronization is described in greater detail in U.S. Patent Publication 2014/0281540, entitled "Keychain Syncing", as well as in the U.S. Provisional Patent Applications 62/168,893 and 62/172,127 as well as the concurrently filed U.S. patent application Ser. No. 14/872,013, which are incorporated by reference above. U.S. Publication 2014/0281540 is also incorporated by reference herein.

The operation of the device 900 to create a backup and a secure escrow object will now be described. In some embodiments, when the device is initially set up (e.g., when the user first turns on the device, sets up the operating system, etc., the recovery key pair generator 930 generates a key pair for the device. This public/private key pair may be used by the device to sign itself into a synchronization circle with the other devices 910, protect data stored on the device, and enable recovery of backup data stored by the device 900 or any of the other devices 910. In addition, the other devices 910 would all have generated their own public/private key pairs, and they share the public keys with the device 900 via the sync engine 925. The device stores the public keys of the other devices 910 as well as its own public and private keys in the local data storage 970, which is representative of the local non-volatile storage on the device (e.g., hard disk, flash memory, etc.).

As shown, the device 900 receives keychain data from (i) data entered by a user of the device (who may also be a user of the other devices 910) and (ii) data received via the synchronization process with devices 910. Though not shown, in some embodiments the user enters passwords or other data through a user interface, and this data is stored as keychain data in a local data storage 970. In addition to the user entering password data, in some embodiments, an algorithm on the device automatically generates passwords for various web sites and stores these in the local data storage 970 as keychain data. As mentioned, the other devices 910 share keychain data with the device 900 via the sync engine 925 and synchronization processes operating on the devices. Some embodiments encrypt this keychain data on the device using, e.g., the public recovery key generated by the recovery key generator 930.

When the device 900 is asked to create a backup (e.g., based on input from the user, a request from one of the other devices 910, a request from the cloud services account, etc.), the keychain data is pulled from the local storage by the keychain backup module 945, and sent to the backup storage 915. In some embodiments, the pieces of data in the keychain are encrypted with a set of item keys, which may be generated on the device or travel with the keychain data. In some embodiments, the keychain data is stored on the local device encrypted with the same item keys, while in other embodiments the data is decrypted (using the private key of the device 900) and re-encrypted with the item keys prior to being sent to the backup storage 915.

In addition, the master recovery key pair generator 935 generates a key pair that will be used for the specific backup. In some embodiments, random or pseudo-random seed data is generated, from which a private key and corresponding public key is generated in a deterministic manner. The public key of this key pair is sent to the keybag encryptor 950, which retrieves the backup keybag and uses the public key of the master recovery key pair to encrypt the backup keybag, as shown in FIG. 5 above. In addition, the private key of the master recovery key pair (or the seed data for the key pair) is sent to the master recovery key encryptor 955, which uses the public keys of the device 900 and the other devices 910 to encrypt separate copies of the master recovery private key (or seed data), as shown in FIG. 6. The keychain backup module 945 transmits the encrypted keybag and the encrypted master recovery keys to the backup storage 915.

Either before or after creating the backup (or concurrently with the backup creation), the device 900 opts to register its private key with the secure escrow service 920, so that the backup can be recovered even if the device 900 is lost or all its data removed. In some embodiments, the device 900 communicates with the secure escrow service 920 (e.g., via a secure channel) to receive the public key of one of the HSMs. In addition, the escrow key generator 940 generates a public escrow key using user-entered data as the seed. The user-entered data is the device passcode, in some embodiments. The public escrow key is used by the recovery object generator 960 to encrypt the device private key and create a recovery object (the encrypted private key). In some embodiments, the recovery object generator 960 also generates escrow key verification data from the private escrow key, and stores the verification data in the recovery object. This recovery object is then encrypted a second time using the public key of the HSM by the escrow object generator 965, in order to create an escrow object. The device then transmits the escrow object to the secure escrow service 920 (e.g., to a set of proxy servers of the secure escrow service 920).

II. Backup Recovery Via Escrow Object

The backups of some embodiments can be easily recovered by either the device that created the backup or any of the other devices whose public keys are used to encrypt the master recovery key for the backup. For instance, in the example of FIG. 9, the device 900 or one of the other devices 910 could easily recover the backup by using their respective private keys to decrypt one of the master recovery objects and access the master recovery key.

However, when a new device needs to access the backup, the new device will need to acquire the private key of one of the private keys whose public key was used to encrypt the master recovery key. Thus, the user of the new device provides the user-entered data associated with one of the established devices (i.e., the device passcode), which allows the new device to generate the private escrow key and send this key (or verification data generated from this key) to the set of secure servers (via a secure channel). The set of secure servers uses their own private key and the received escrow private key verification data to (i) decrypt the escrow object and (ii) verify that the verification data sent by the new device matches that stored in the recovery object (assuming that the user-entered data was correct). The set of secure servers then allow the transmission of the encrypted recovery key back to the new device, so that the new device can use the private escrow key to decrypt the recovery key and then decrypt one of the copies of the master recovery key stored with the backup.

Each of the escrow objects is protected in some embodiments not only by the two public-private key pairs, but also by an algorithm that prevents repeated attempts to access each of the escrow objects. Specifically, some embodiments allow only a given number of attempts to access each escrow object (e.g., 10, 50, 100, etc.). When the maximum number of attempts have been made to access one of the secure escrow object without success, the object is locked (for at least an extended period of time).

Figure 10:
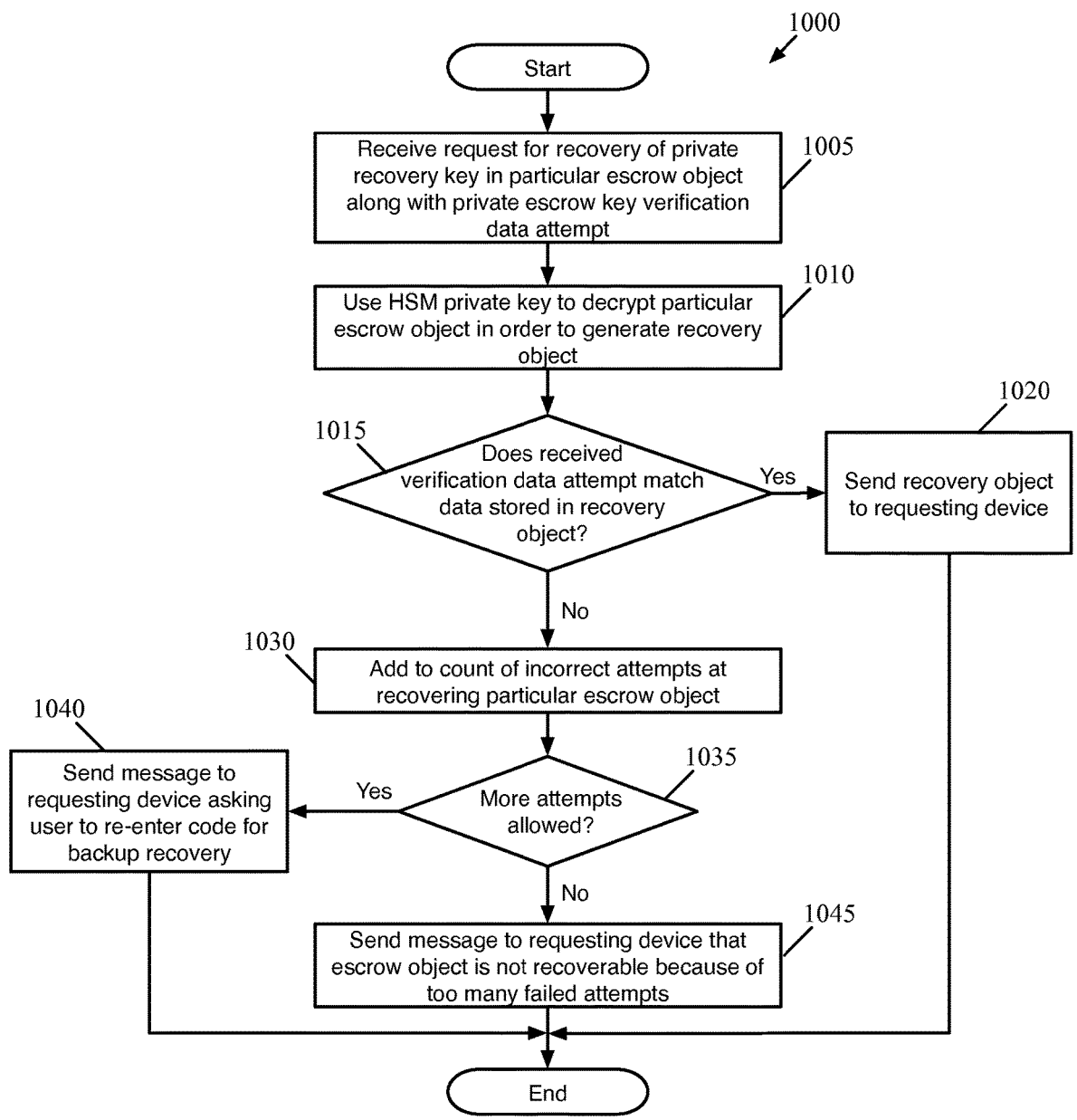
FIG. 10 conceptually illustrates a process performed by one of the secure servers of a secure escrow service to verify a received escrow key and return the escrowed private recovery key to a requesting device if the requesting device has provided the correct escrow key.

FIG. 10 conceptually illustrates a process 1000 performed by one of the secure servers of a secure escrow service to verify an escrow key attempt and return the escrowed private recovery object to a requesting device if the requesting device has provided the correct escrow key verification data. In some embodiments, the process 1000 (or a similar process) is performed by a highly secure HSM that has its own public/private key pair. The process 1000 will be described in part by reference to FIG. 11, which conceptually illustrates the decryption and verification operations performed by the HSM in some embodiments.

As shown, the process 1000 begins by receiving (at 1005) from a device a request for recovery of a particular private recovery key stored in a particular encrypted escrow object, along with a private escrow key attempt. By this time, the requesting device would have logged into the cloud services account. Once logged in, some embodiments provide the new device with information to select the secure escrow object that the device will attempt to recover (i.e., by providing the device with information about the other devices that are part of the cloud services account. In addition, the new device would have set up a secure channel (e.g., with the secure remote password (SRP) protocol) between itself and the HSM. Via this secure channel, the HSM receives the private escrow key attempt. In some embodiments, this private escrow key attempt includes escrow key verification data generated on the device from the private escrow key. In addition, if the HSM does not itself store the escrow object, the proxy server that stores the escrow object would have sent the object to the HSM that performs the process 1000.

Figure 11:
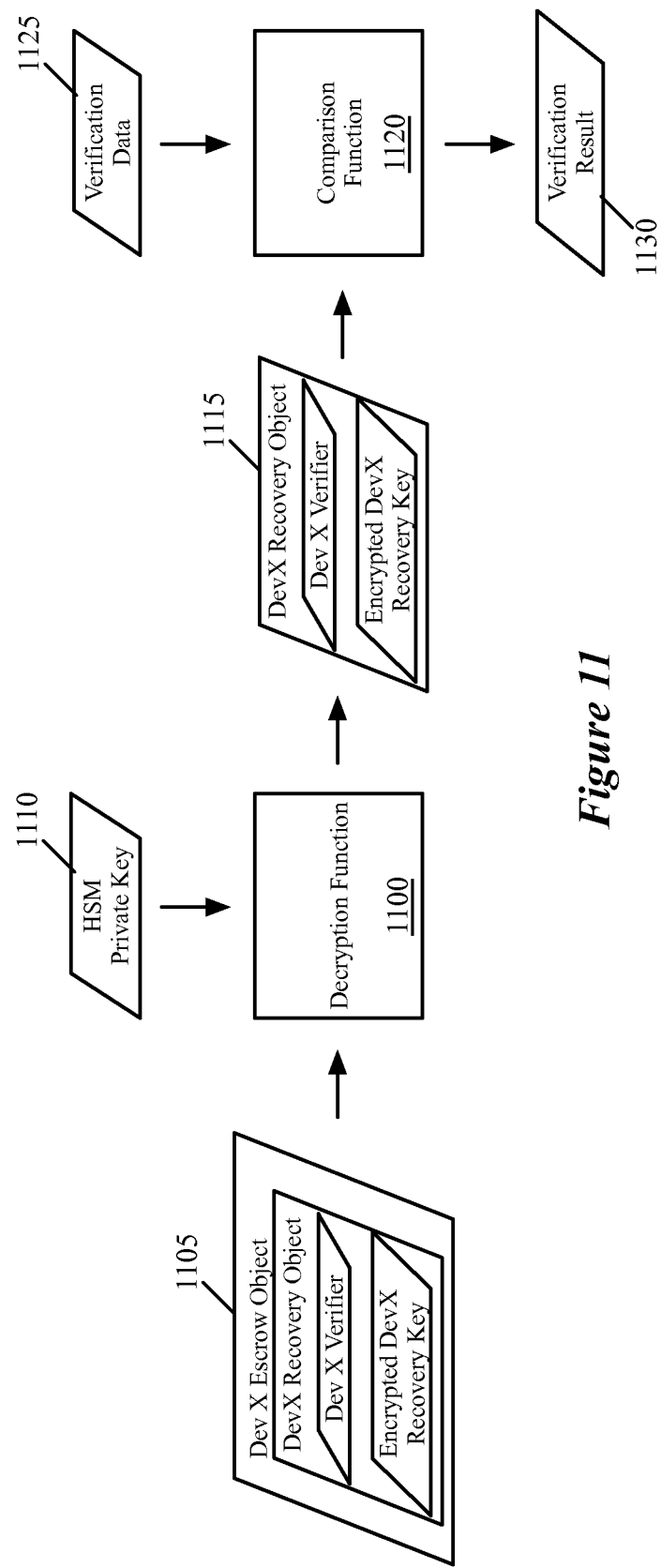
FIG. 11 conceptually illustrates the decryption of an escrow object that stores a twice-encrypted private recovery key of a particular device.

The process then uses (at 1010) the HSM private key to decrypt the particular escrow object (to which the new device requests access) in order to generate a recovery object. The HSM, as mentioned, stores a public/private key pair, and would have sent the public key to the device that registered the particular escrow object in order for the device to encrypt the recovery object with the public key and generate the escrow object. Thus, the HSM uses the corresponding private key to decrypt the escrow object and retrieve the recovery object. FIG. 11 conceptually illustrates the decryption of the escrow object 1105 that stores the twice-encrypted private recovery key of a particular device, as well as the verification data generated from the escrow key at the time the escrow object was created. As shown, an escrow object 1105 (which could be, e.g., the escrow object 845) registered by device X is fed into a decryption function 1100 on the HSM. The decryption function 1100, in some embodiments, is the decryption portion of an asymmetric cryptographic operation, such as RSA, DSS, elliptic curve encryption, etc. In this case, the decryption function uses the private key 1110 of the HSM to decrypt the escrow object 1105, thereby revealing the recovery object 1115.

The process 1000 then determines (at 1015) whether the received private escrow key verification data attempt matches the verification data stored in the recovery object. This ensures that the device passcode or other user-entered data is correct, as the verification data stored in the recovery object will only match the received verification data if the user-entered data is correct, as these two data are generated in the same deterministic manner (e.g., using a hash function). As shown in FIG. 11, the recovery object 1115 (specifically the verification data stored in the recovery object by the device X) is used as an input to the comparison function 1120, which also uses the verification data 1125 received from the requesting device. This provides a verification result 1130, which indicates either that the attempt matched or did not match. When the verification data matches and the escrow attempt is verified, the process sends (at 1020) the recovery object to the requesting device (that provided the escrow key verification data attempt). In some embodiments, as mentioned, the requesting device would have already set up a secure channel with the HSM, and the HSM sends the private recovery object (e.g., including the recovery key encrypted with the escrow key) to the requesting device via this secure channel.

However, when the escrow key attempt received from the requesting device is not correct (because, e.g., the user entered the wrong passcode or entered the passcode for the wrong device in order to generate the escrow key), the process adds (at 1030) to the count of incorrect attempts at acquiring the particular escrow object. As mentioned, some embodiments only allow a certain number of attempts (e.g., 5, 10, 25, 50, etc.) at a particular escrow object before locking the user out of the escrow object and not permitting any further attempts. In some embodiments, this is a feature of the HSMs that cannot be disabled, thereby preventing an entity that owns and operates both the secure escrow service and the cloud storage where the backup data is located (or an outside attacker) to have the ability to make a brute force attempt to access the private recovery key. Some embodiments use a geometrically increasing timeout period with each failed attempt, while not strictly locking the particular escrow object, as described in U.S. Patent Publication 2014/0093084, which is incorporated by reference above. In addition, some embodiments, as described in U.S. 2014/0093084, ensure that the HSM code cannot be changed by making the key recovery dependent on a check (e.g., using a hash function) that the code has not been modified since the creation of the escrow object.

After adding to the count of incorrect attempts for the particular escrow object, the process 1000 determines (at 1035) whether any additional attempts are allowed (i.e., whether the maximum number of allowed failed attempts have been made to access the encrypted key). Some embodiments send different messages to the requesting device depending on whether additional attempts are allowed.

When additional attempts are allowed, the process sends (at 1040) a message to the requesting device asking the user to re-enter the code for backup recovery. In some embodiments, the message simply tells the requesting device that the escrow key was not correct, which the device translates into requesting that the user re-enter the code. Some embodiments additionally specify the number of remaining attempts, so that the device can warn the user if the number of such attempts is low.

When no additional attempts are allowed, the process sends (at 1045) a message to the requesting device that the escrow object is not recoverable because too many failed attempts have been made. In some embodiments, the device informs the user that the backup needs to be recovered with a passcode for a different one of the devices that have registered escrow objects, if such additional recovery objects exist with the secure escrow service. For instance, in some embodiments the device removes the device that registered the particular escrow object from a list of devices presented to the user, the passcodes of which the user may enter in order to recover the backup data.

Figure 12:
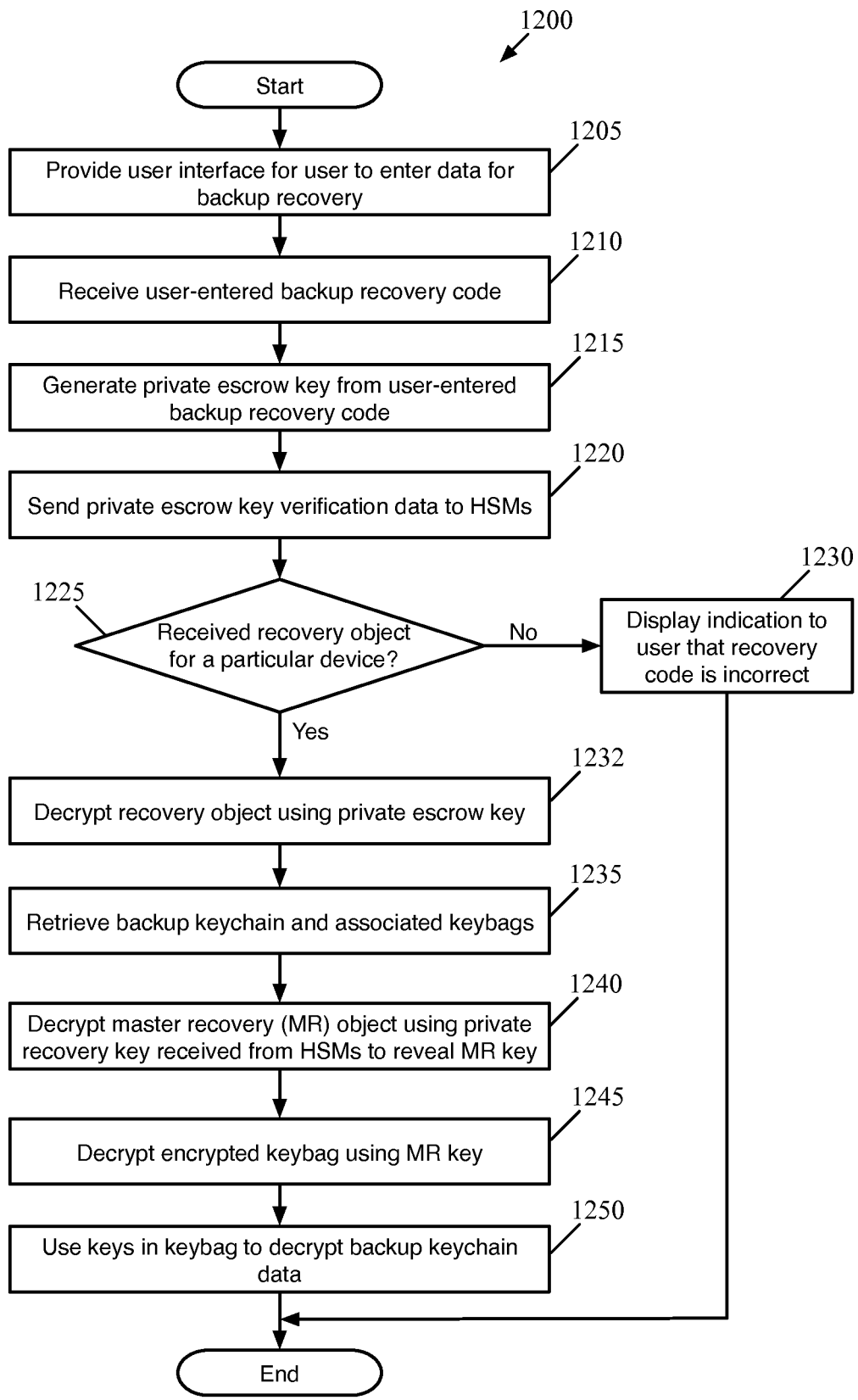
FIG. 12 conceptually illustrates a process of some embodiments performed by a user device to recover backed up data.

While the above description describes the actions performed by the HSM, FIG. 12 conceptually illustrates a process 1200 of some embodiments performed by a user device to recover backed up data protected in the manner described in Section I. In some embodiments, the process 1200 is performed by a device when the user sets up the device, after logging onto the cloud services account (which enables the new device to view a list of devices associated with the account that have registered escrow objects). The new device may be a brand new device, or one of the established devices that has had its memory erased (and therefore has lost its device key pair used to access the master recovery key). The process 1200 will be described in part by reference to FIG. 13, which conceptually illustrates the backup recovery decryption operations to access the encrypted backup keybag.

As shown, the process 1200 begins by providing (at 1205) a user interface for the user to enter data for backup recovery. In some embodiments, this interface includes a list of devices that have registered escrow objects for the cloud services account with which the new device has been associated. When the user selects one of the established devices from the list, the new device provides the user with an interface via which the user can enter the passcode for the selected device, from which the escrow key can be generated. The device then receives (at 1210) the user-entered backup recovery code (e.g., the passcode). In other embodiments, the interface may ask the user for a series of inputs (e.g., questions only the user would know) as an alternative to or in addition to the device passcode.

Based on the user-entered backup recovery code, the process generates (at 1215) a private escrow key, and escrow key verification data from the private escrow key. As mentioned, the key generation process and subsequent verification data generation process are deterministic, such that if given the same seed data, the process will produce the same key and subsequently the same verification data. Thus, if the user enters the passcode that was used on the selected established device, the new device will generate the correct private escrow key that will unlock the escrow object registered by the selected established device. The process 1200 then sends (at 1220) the generated private escrow key verification data to the HSM with which the escrow object is registered. As noted above, in some embodiments the device transacts with the HSMs via a secure channel. The secure channel uses, e.g., the secure remote password protocol, and is secure from man-in-the-middle style attacks.

Having sent the private escrow key verification data to the HSM, after the HSM performs process 1000 (or a similar process), the process 1200 determines (at 1225) whether it received a private recovery object (containing the private recovery key) for a particular device from the HSM via the secure channel. As shown in FIG. 10, the new device will either receive the private recovery object registered with the secure escrow service or receive a message indicating that the attempt failed (and, in some embodiments, the number of remaining attempts).

When the new device does not receive the recovery key (and therefore has received a message indicating that the attempt failed), the process displays (at 1230) an indication to the user that the recovery code is incorrect. As described above, this indication may ask the user to re-enter the recovery code if more attempts are available, or may inform the user that too many attempts have been made at the particular escrow object, and the object is now locked. In that case, the device may also ask the user to select a different one of the established devices for which the user will attempt to enter the backup recovery code.

Figure 13:
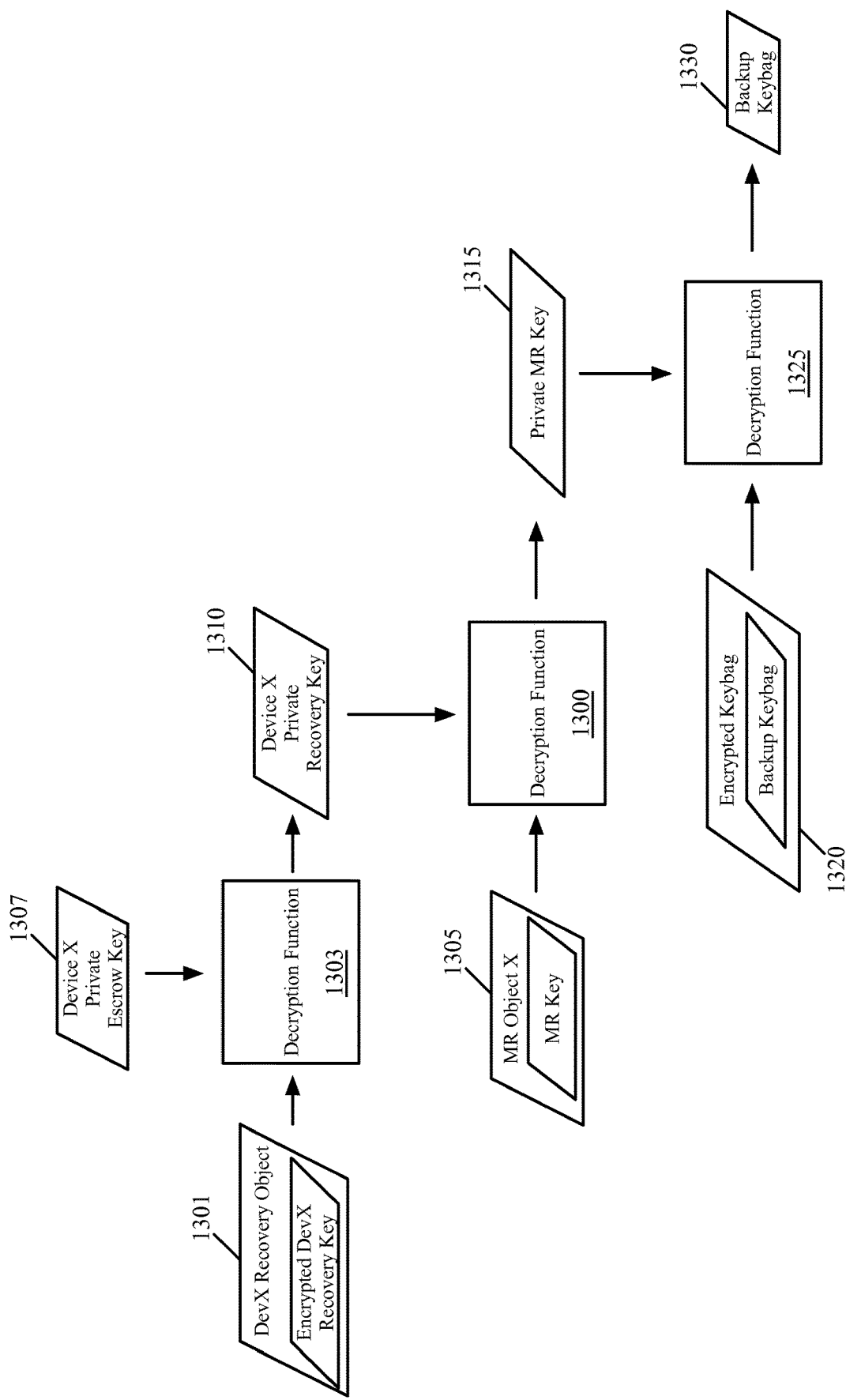
FIG. 13 conceptually illustrates the backup recovery decryption operations to access the encrypted backup keybag.

On the other hand, when the device recovery key is received (indicating that the user entered the backup recovery code properly, the process 1200 will be able to retrieve and decrypt the backup data. As such, the process first decrypts (at 1232) the recovery object using the private escrow key generated from the user-entered data. This provides access to the private recovery key. FIG. 13 conceptually illustrates the decryption of the recovery object 1301. As shown, the recovery object 1301 for device X (the recovery object received from the secure escrow service) is fed into a decryption function 1303 that uses the private escrow key 1307 (generated from the user-entered data, and from which the verification data was generated). This decryption operation 1303 reveals the private recovery key for device X that was stored with the HSM in twice-encrypted fashion.

Next, the process 1200 retrieves (at 1235) the backup keychain data, encrypted keybag, and at least one master recovery object from the backup storage. As mentioned, the backup storage may be a local drive owned by the user of the new device, or could be located in cloud storage associated with a user account to which the user has already logged in. The process then decrypts (at 1240) the master recovery object encrypted with the public key to which the recovered private key corresponds using that private recovery key received from the HSM, which reveals the master recovery key (or master recovery key data). FIG. 13 conceptually illustrates the decryption of the backup keybag, which first requires the decryption of the master recovery key needed to decrypt the backup keybag. As shown, a master recovery object 1305 is fed into a decryption function 1300 that uses the recovered private key 1310 (that corresponds to the device whose public key was used to encrypt the master recovery key for the particular master recovery object 1305). This decryption operation 1300 reveals the master recovery private key 1315, or data from which the private master recovery private key can be deterministically generated.

The process next uses the master recovery key to decrypt (at 1245) the encrypted backup keybag. FIG. 13 conceptually illustrates that the encrypted keybag 1320 is fed into a decryption function 1325 that uses the master recovery private key 1315 (revealed by the previous decryption operation). This reveals the backup keybag 1330. The process 1200 then uses (at 1250) the keys in the recovered backup keybag to decrypt the backup keychain data, and thereby restore the backed up keychain data for the new device. For instance, if this data has the user's passwords for various websites, the user will not have to remember the passwords and enter them for these websites on the new device.

The use of the verification data enables the secure escrow service to securely protect the private recovery key without the recovery key ever being sent unencrypted between the secure servers and the user device. When the recovery key is registered with the escrow service, the key is already encrypted with both the escrow key and the HSM key. While stored with the escrow service, the owner of the escrow service (or an agent acting through the owner) cannot make attempts to access the recovery key without using the HSM (because the HSM private key is required to even access the recovery object), and doing so via a brute force attempt will quickly cause the HSM to lock the recovery object. Even when the recovery key is returned to the new device, this key is still encrypted with the escrow key during transmission.

Figure 14:
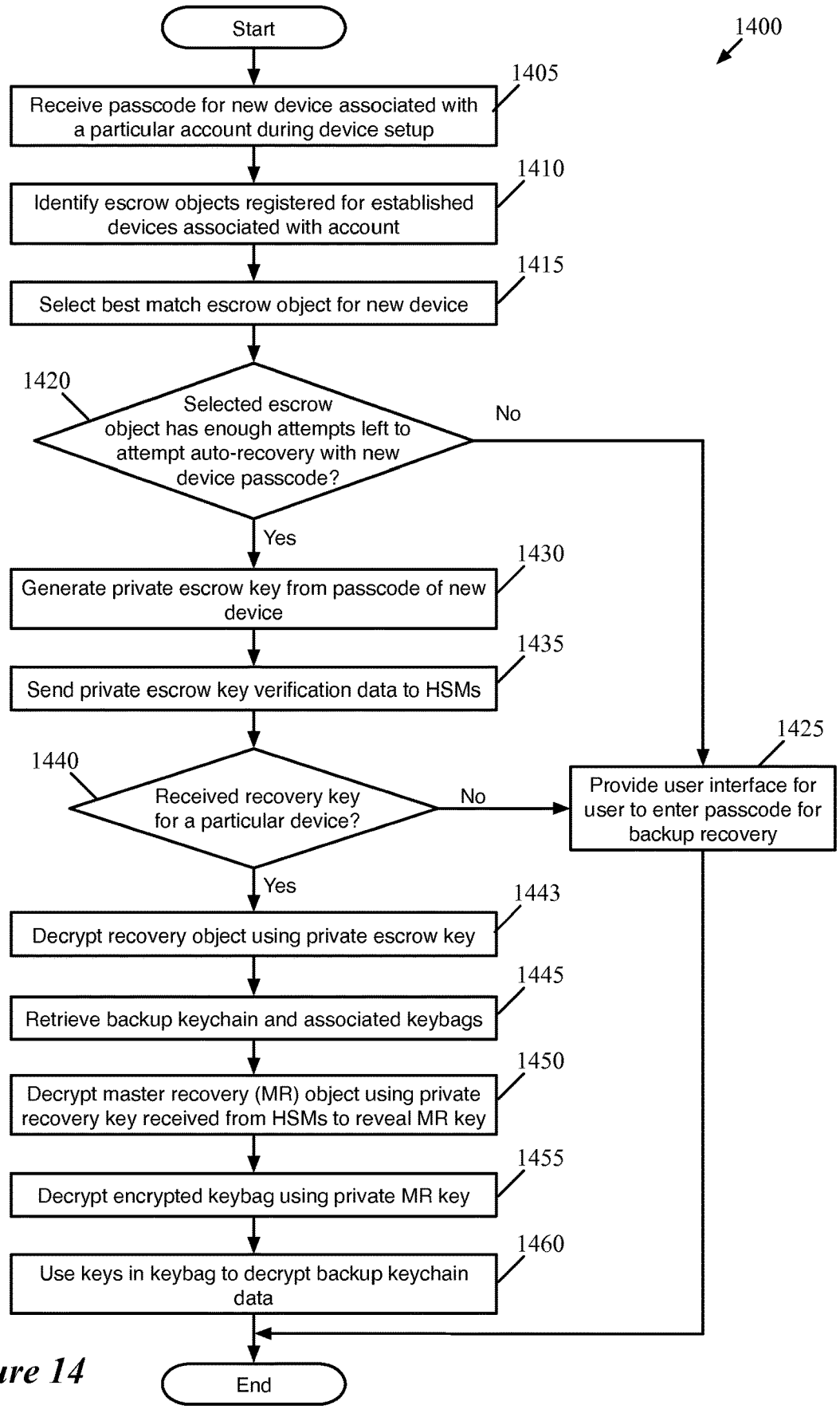
FIG. 14 conceptually illustrates a process of some embodiments performed by a new user device to automatically recover backed up data.

As mentioned, when a user sets up a new device in some embodiments, the new device automatically attempts using the passcode of the new device as the passcode for generating an escrow key for one of the established devices, so long as doing so will not cause the user to be locked out of the escrow record. FIG. 14 conceptually illustrates a process 1400 of some embodiments performed by a new user device to automatically recover backed up data protected in the manner described in Section I. In some embodiments, the process 1400 is performed by a device when the user sets up the device, after logging onto the cloud services account (which enables the new device to view a list of devices associated with the account that have registered escrow objects). The new device may be a brand new device, or one of the established devices that has had its memory erased (and therefore has lost its device key pair used to access the master recovery key).

As shown, the process 1400 begins by receiving (at 1405), during account setup, a passcode for the new device, which at this point has been associated with a particular cloud services account. In some embodiments, the user enters the device passcode prior to logging onto the cloud services account. Either way, the process 1400 can begin once both of these conditions have been met. The passcode may be of any length (e.g., a four-digit passcode, or a longer passcode).

Having logged into the cloud services account of the user, with which multiple other devices are associated, the process identifies (at 1410) escrow objects registered for one or more of the established devices associated with the account. This information may be available from the other devices, from the cloud services, or from the secure escrow service in different embodiments. In some embodiments, the information identifies the type of device (e.g., smart phone, smart watch, tablet, laptop, desktop, etc.) for each escrow record, possibly by name (if the user has given identifying names to the different devices).

The process 1400 then selects (at 1415) a best match escrow object for the new device. Specifically, the process uses a set of heuristics to determine on which of the established devices the user is most likely to have used the same passcode as on the new device. For example, if the new device is a new smartphone, then some embodiments attempt to determine which of the established devices is a smartphone being replaced by the new phone. If the established devices only include one phone, then the new device will typically select that established phone. If multiple devices of the same type as the new device exist, different embodiments base the selection on which escrow record is more recent, usage patterns of the devices, the model of the old devices (e.g., an iPhone 4 vs. an iPhone 5), etc. If no devices of the same type exist, some embodiments either determine a similar type of device (e.g., a device that uses the same operating system) or proceed to operation 1425.

With the best match selected, the process determines (at 1420) whether the selected escrow object has enough attempts left (before being locked) to attempt auto-recovery with the new device passcode. Different embodiments use different sets of heuristics to determine whether enough attempts remain. Some embodiments will attempt the auto-recovery if doing so will not lock the user out of the record (i.e., if the escrow record has two or more attempts remaining). Other embodiments only attempt auto-recovery if no failed attempts have been made for the selected record, or if a particular number of attempts remain (or a particular percentage of the overall allowed attempts remain).

When the process opts to not attempt auto-recovery because there are not enough attempts remaining for the selected escrow record, the process provides (at 1425) a user interface for the user to enter a passcode for backup recovery. In some embodiments, this begins the process 1200 (or a similar process), in which the user selects one of the established devices and provides the passcode for the selected device in order to generate the private escrow key.

On the other hand, when the process 1400 determines that enough attempts remain to attempt auto-recovery, the process generates (at 1430) a private escrow key from the passcode of the new device, and escrow key verification data fro the private escrow key. As mentioned, the key generation process and subsequent verification data generation process are deterministic, such that if given the same seed data, the process will produce the same key and subsequently the same verification data. Thus, if the user enters a passcode for the new device that is the same as was used on the selected established device, the new device will generate the correct private escrow key that will unlock the escrow object registered by the selected established device. The process then sends (at 1435) the generated private escrow key verification data to the HSM with which the escrow object is registered. As noted above, in some embodiments the device transacts with the HSMs via a secure channel. The secure channel uses, e.g., the secure remote password protocol, and is secure from man-in-the-middle style attacks.

Having sent the private escrow key to the HSM, after the HSM performs process 1000 (or a similar process), the process 1400 determines (at 1440) whether it received a private recovery key for a particular device from the HSM via the secure channel. As shown in FIG. 10, the new device will either receive the private recovery object registered with the secure escrow service or receive a message indicating that the attempt failed (and, in some embodiments, the number of remaining attempts). When the attempt fails, the process proceeds to operation 1425, described above, to allow the user to manually select one of the established devices and provide its passcode. When the attempt is successful, the new device can retrieve and decrypt the backup data. As such, the process 1400 performs operations 1443-1460 to do so, which are similar to operations 1235-1250 of the process 1200 in some embodiments.

III. Backing Up Subset of Keychain Data

In some cases, the set of data synchronized between a set of related devices (e.g., a set of devices associated with a particular account, such as a cloud services account) is broken down into several subsets, with each piece of data being assigned to one or more such subsets according to a set of criteria (e.g., with passwords for different types of applications or websites assigned to different subsets). Each subset of data is shared among a subset of the related devices that satisfy various criteria for joining a synchronization sub-group (e.g., having a particular property, or proving ownership of a particular cryptographic secret). In this case, some embodiments enable the user of the devices to create separate backups for each of these subsets of data. The device creating the backup for a particular data subset generates a master recovery key for the backup, then encrypts the master recovery key using the public keys of only the devices that are authorized to share the data subset, rather than all of the devices.

Figure 15:
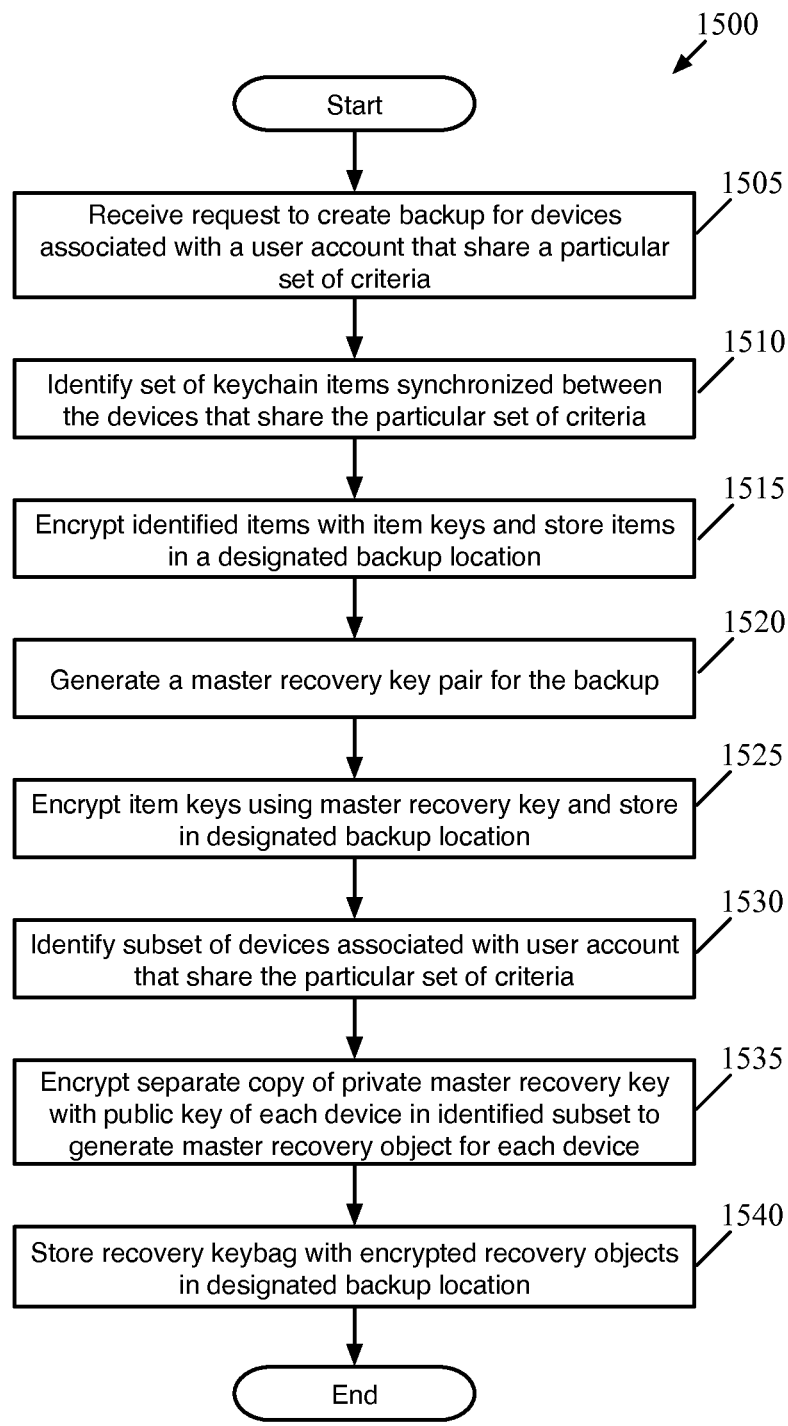
FIG. 15 conceptually illustrates a process of some embodiments for creating a backup for a data subset that is shared between only some of the devices (referred to as a "view").

FIG. 15 conceptually illustrates a process 1500 of some embodiments for creating a backup for a data subset that is shared between only some of the devices (referred to as a "view"). The process 1500 is performed by one of the devices that shares the subset of synchronization data, as the other related devices do not store the data for the backup. For instance, the synchronized data in some embodiments might include passwords for various financial websites. However, as this data is more sensitive than, e.g., the password for a streaming video service, the user might allow the streaming video service password to be shared between all of her devices, whereas the financial passwords are only shared between devices that meet more stringent requirements (e.g., that are protected by passcodes of at least a certain length, and/or that have remote wipe capabilities, etc.). The grouping of data and devices into such subsets is described in greater detail in the U.S. Provisional Patent Applications 62/168,893 and 62/172,127 as well as the concurrently filed U.S. patent application Ser. No. 14/872,013, which are incorporated by reference above. The process 1500 will be described by reference to FIG. 16, which conceptually illustrates the creation of a backup for such a subset of data. As shown, this figure includes a backup view generator 1600, which defines which data (and therefore which item keys) should be included in the backup, and which devices should be able to access the backup.

As shown, the process 1500 begins by receiving (at 1505) a request to create a backup for devices associated with a user account that share a particular set of criteria. As with a backup for all of the synchronization data, in some embodiments the request is externally generated by user input requesting that a backup be created or from an external server (e.g., a server associated with the cloud services account to which the various devices belong). In other embodiments, the request for creation of a backup is internally generated (e.g., based on a set of conditions being met, or a particular period of time having passed since a most recent backup was created by the device or for one of the associated devices).

The process then identifies (at 1510) the set of keychain (or other data) items synchronized between the subset of devices that share the particular set of criteria. In some embodiments, each keychain item is tagged as belonging to one or more views, based on the type of data. For instance, some embodiments tag keychain items based on the application to which they pertain (e.g., Wi-Fi passwords tagged based on being stored for the wireless networking application, passwords for websites tagged based on being stored for the web browser application, etc.). Some embodiments tag keychain items based on additional criteria, such as the particular web domains for which they are used (e.g., yahoo.com, bankofamerica.com, etc.), or other criteria. The backup process of some embodiments identifies all of the keychain items (and their keys) that are tagged as belonging to the particular view that is being backed up.

The process 1500 encrypts (at 1515) the identified items with their item keys and stores the items in the designated backup location. As with the process 400 of FIG. 4, some embodiments encrypt each of the items with a different key for the backup storage, while other embodiments use the same key for encrypting the various backed-up data items. In addition, some embodiments store the data items on the device in encrypted fashion. In some such embodiments, the data items are encrypted with a different key or set of keys for storage on the device, and are thus decrypted and then re-encrypted with the item keys for storage in the backup location. In other such embodiments, the data items are encrypted with the data item keys for storage on the device, and therefore the encryption of operation 1515 actually takes place before the process 1500. The designated backup location, in some embodiments, is a cloud storage of the cloud services account to which the associated devices belong. In other embodiments, the backup storage location may be owned by the user (e.g., an external drive designed for storing device backups).

Next, the process generates (at 1520) a master recovery key for the backup. Some embodiments, to generate a master recovery key pair, use a randomly-generated seed data (e.g., a random 128-bit, 256-bit, etc. seed). The randomly-generated seed data of some embodiments is not tied to the device in any identifiable way, and changes depending on the time that the backup is created. From the randomly-generated seed data, some embodiments use a deterministic one-way key generation function to defined a private master recovery key and a public master recovery key.

The process then encrypts (at 1525) the item keys for the identified data items using the public master recovery key and stores the encrypted keybag in the designated backup location. In some embodiments, the item keys are stored in a backup keybag, which is itself encrypted. That is, the item keys are not individually encrypted, but rather the entire keybag storage structure is encrypted via one application of the encryption function.

Figure 16:
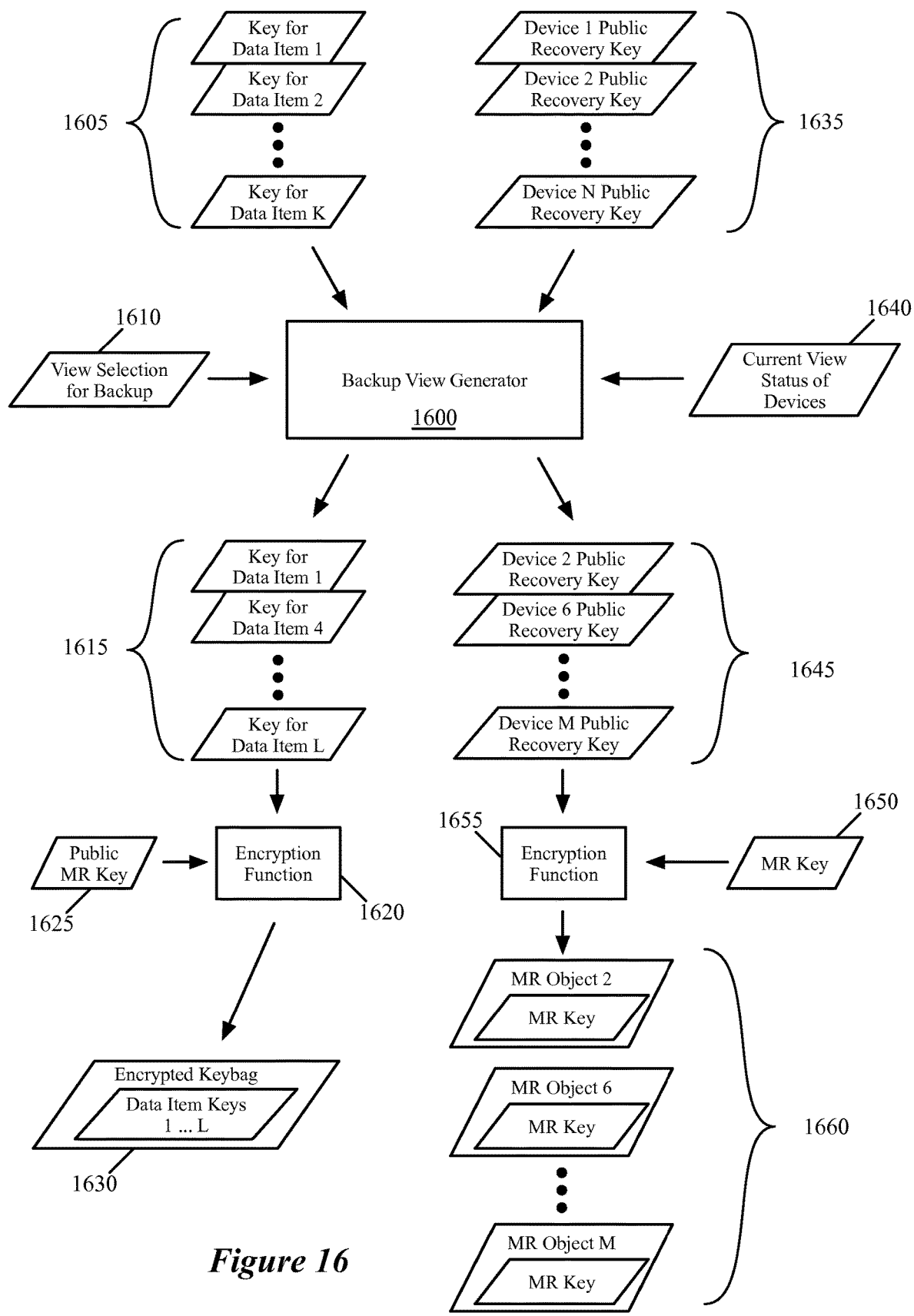
FIG. 16 conceptually illustrates the creation of a backup for a subset of data.

FIG. 16 illustrates a set of keychain data item keys 1605 for data items 1-K that represent the keys for encrypting each of the data items in the keychain that are stored on a device creating a backup for a particular view. However, if the device participates in more than one view, some of the keychain data items may not belong to the view being backed up, and therefore the data items and their keys should not be stored with the backup. As such, based on the view selection data 1610, the backup view generator 1600 selects only the keys 1615 for the data items that are tagged as belonging to this selected view. Though not shown, the backup view generator 1600 also selects the data items, which are encrypted with their respective keys and stored as the backup keychain data.

The item keys 1615 for the selected items are fed into the encryption function 1620, which uses the master recovery public key 1625 to perform asymmetric encryption (e.g., RSA, DSS, elliptic curve encryption, etc.). This encryption operation results in an encrypted keybag 1630, which stores the data item keys 1, 4 . . . L, etc. (where K>=L) for only the items that are backed up for the selected view.

Returning to FIG. 15, the process 1500 also identifies (at 1530) the subset of devices associated with the user account that share the particular set of criteria (i.e., that participate in the view). In some embodiments, the determination of which devices participate in a particular view is based on a set of view requirements. The view requirements of some embodiments define which rings a device must be a member of to participate in a view, where the rings define a set of requirements for the device (e.g., passcode requirements, the possession of a specific private key to sign an application into the ring, device operating system requirements, etc.). When a device is certified as a member of all of the rings that are required for a particular view, the device is allowed to participate in that view (by synchronizing the data that belongs to the view with other devices that participate in the view).

With the subset of devices identified, the process encrypts (at 1535) a separate copy of the private master recovery key (or the randomly-generated seed data for the master recovery key) with the public key of each of the devices in the identified subset. This generates a separate master recovery object for each device that participates in the view. Any of these devices can then use their private key to decrypt their respective master recovery object (once stored in the backup) and thereby use the master recovery key to access the backup data, while the other devices associated with the cloud storage account that do not participate in the view are not able to access the backup data (unless the user provides the passcode for one of the participating devices to one of the other devices in order to recover the private key of the participating device via the escrow service. Finally, the process stores (at 1540) a recovery keybag with the encrypted recovery objects in the designated backup location.

FIG. 16 shows that the backup view generator, in addition to identifying the subset of data items and item keys to store in the backup, also identifies which device public keys should be used to encrypt the master recovery key. As shown, the device creating the backup stores the public keys 1635 of related devices 1-N that are part of a data synchronization group with the device creating the backup (one of these devices 1-N). The backup view generator 1600, based on the selected view 1610 and the current view status 1640 of the devices, identifies the subset of devices that participate in the view and outputs only the public keys 1645 for these identified devices (one of which is the public key for the device creating the backup). These public keys 1645 are then used by the encryption function 1655 to separately encrypt copies of the master recovery key 1650 (representative of either the private master recovery key or the seed data for the master recovery key pair). The encryption function 1655, which may be another instance of the encryption function 1620, outputs several master recovery objects 1660 accessible by the private keys of the devices that participate in the backed up view.

IV. Updating a Backup

In some embodiments, the user of a set of related devices may wish to update a backup that was previously created for the set of devices (or for a particular view), or the device that created the backup automatically updates the backup. Rather than deleting an existing backup and re-creating the backup with the entire set of synchronization data, some embodiments use a transaction log to update the backup by only modifying the backup based on changes since the backup was created (or last updated).

Figure 17:
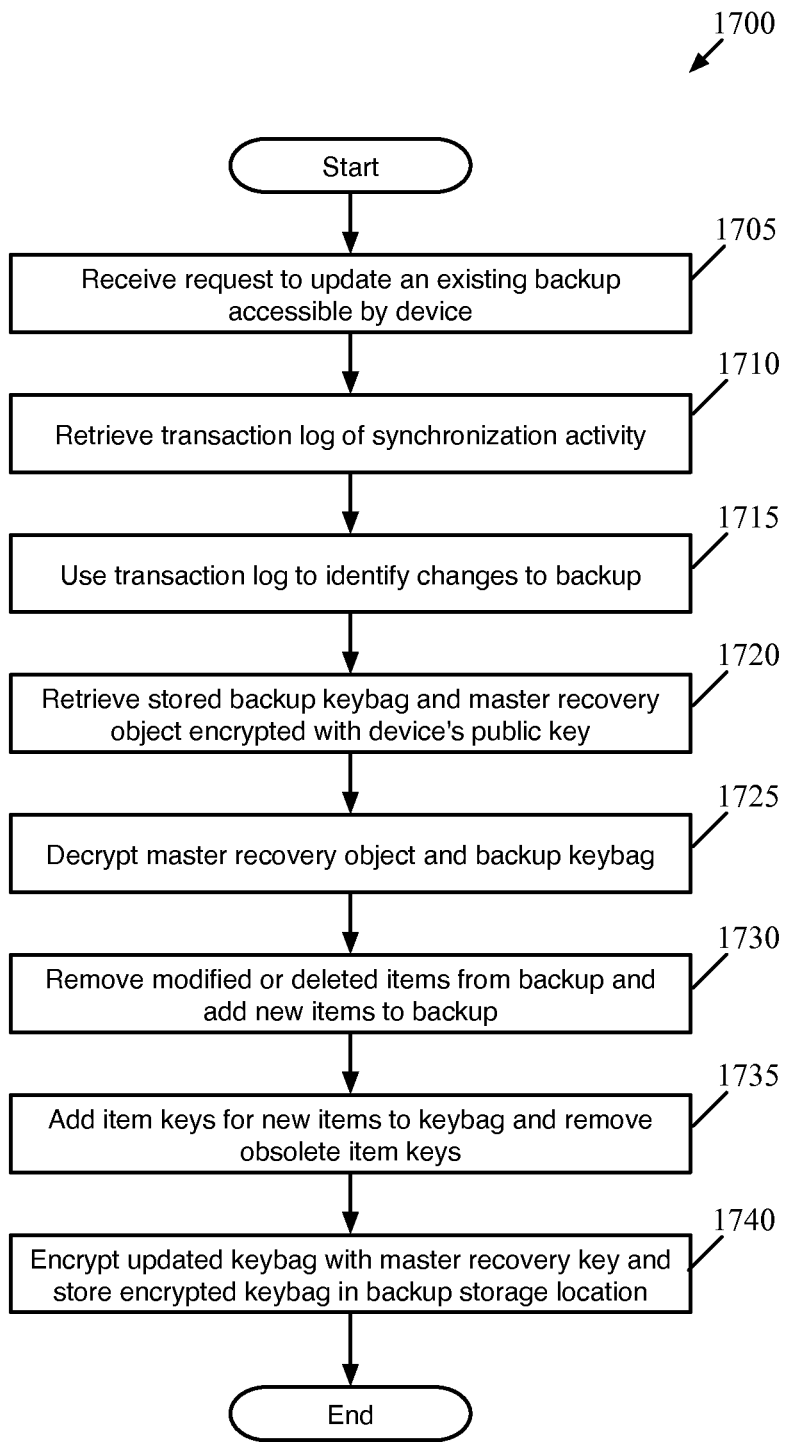
FIG. 17 conceptually illustrates a process of some embodiments for updating a previously created backup for a set of related devices.

FIG. 17 conceptually illustrates a process 1700 of some embodiments for updating a previously created backup for a set of related devices (either the full set of devices associated with a cloud services account, or a subset of such devices that participate in a particular view). In some embodiments, the process 1700 is performed by any of the devices that are allowed to access the backup. That is, in some embodiments the device that updates a backup need not necessarily be the same device that initially created the backup, so long as the transaction log can be maintained across the devices. Other embodiments require the updating device to be the device that created the backup, to ensure that the transaction log accurately identifies which changes to the set of keychain data are new to the backup.

Figure 18A:
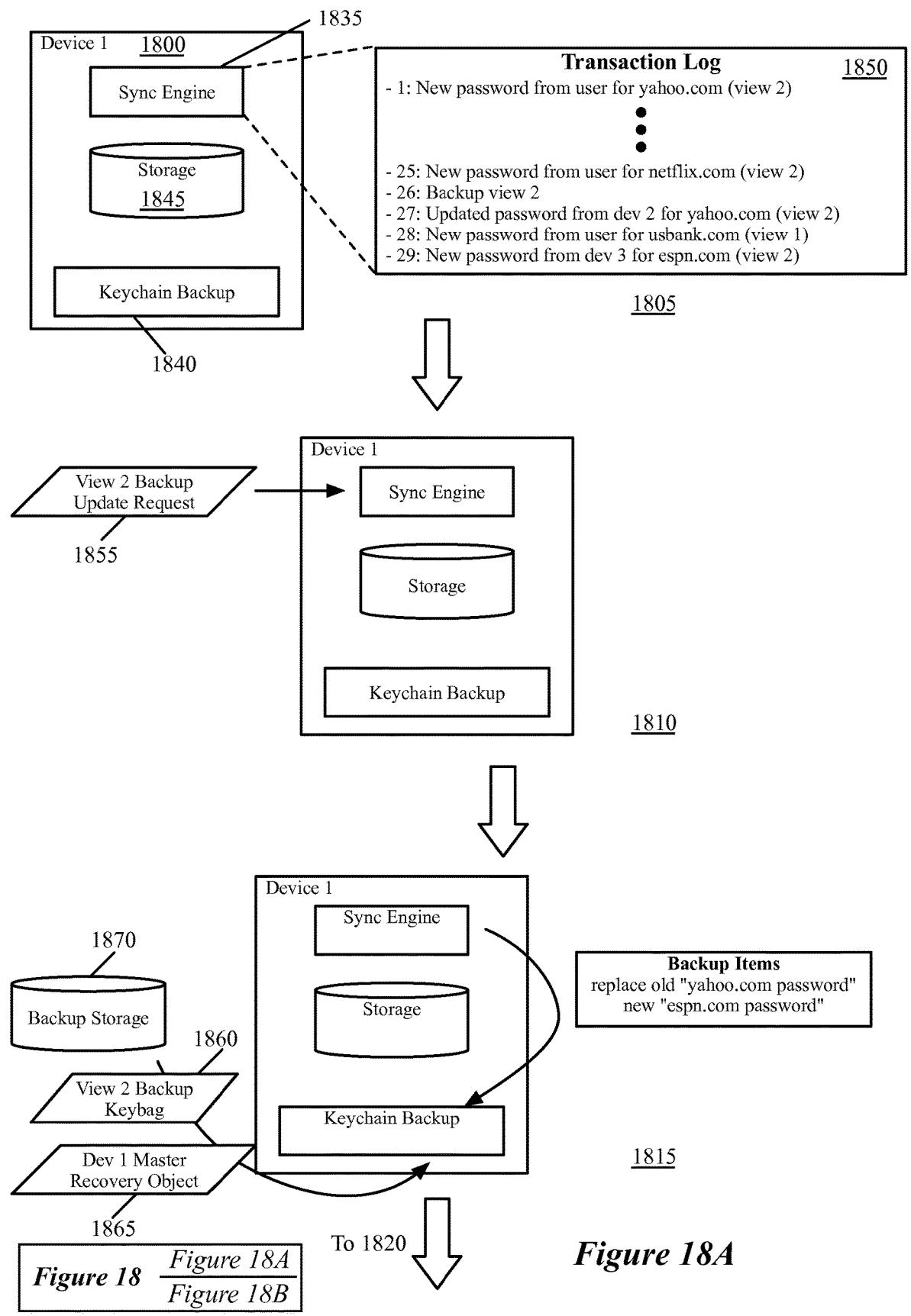
FIGS. 18A-B illustrate an example of a device updating a backup that it previously created for a particular view.
Figure 18B:
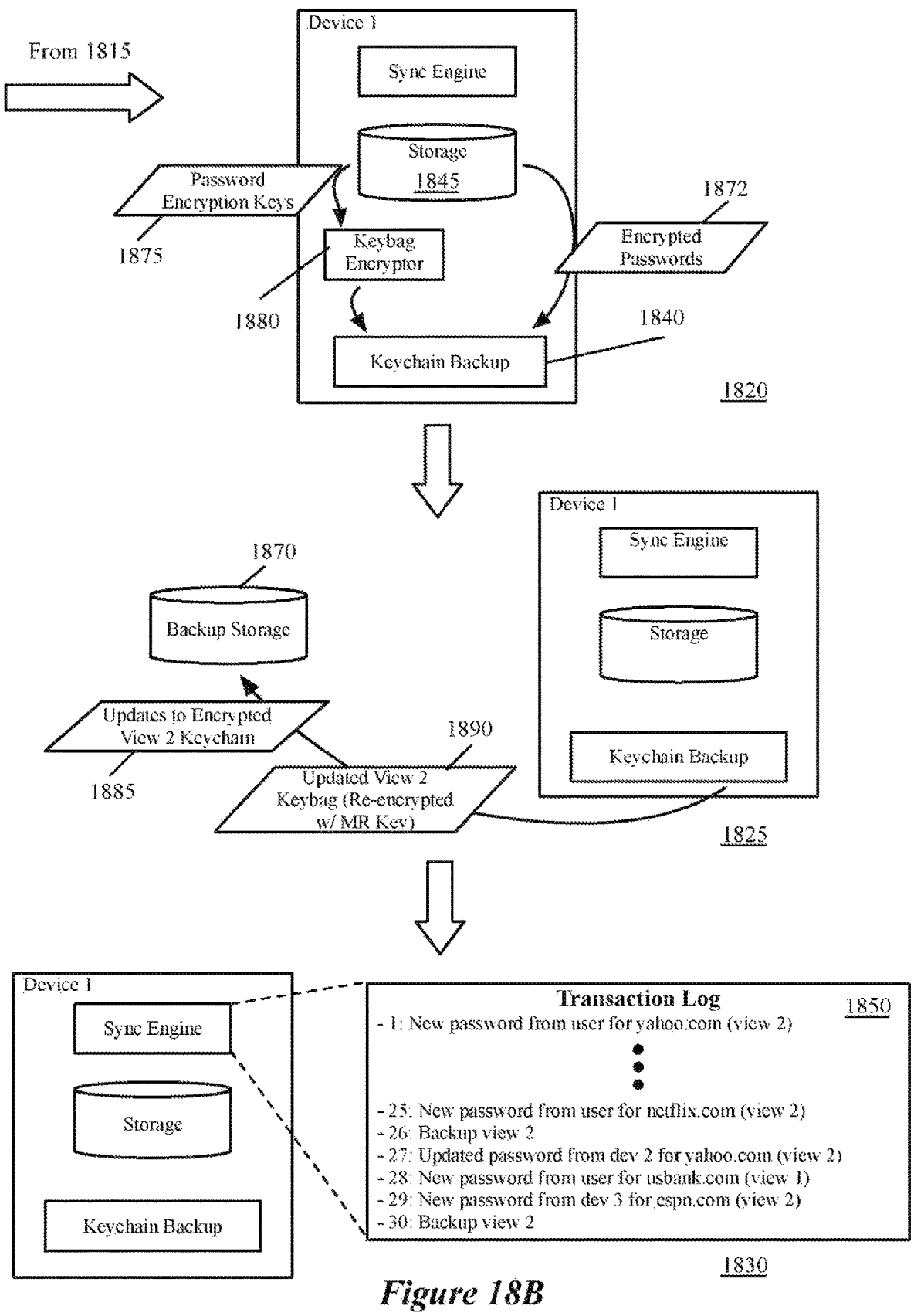

The process 1700 will be described in part by reference to FIGS. 18A-B, which illustrate an example of a device 1800 updating a backup that it previously created for a particular view over six stages 1805-1830. As shown in the first stage 1805, the device 1800 includes a synchronization engine 1835, a keychain backup module 1840, and a storage 1845. The synchronization engine 1835 of some embodiments, in addition to handling synchronization with other devices (e.g., by setting up secure channels between the device 1800 and its related devices, also maintains a transaction log 1850 of the keychain-related operations. In some embodiments, the synchronization engine 1835 also manages the backup operations through the keychain backup module, which communicates with the backup storage location.

The transaction log 1850 of some embodiments stores a log of changes to the keychain data in some embodiments. These changes may include the addition, removal, or changing of keychain data (changes to a keychain data item may, in some embodiments, be treated as a removal of the data item with a subsequent addition of a new data item). In this case, the transaction log 1850 starts with a first entry for a new password for the domain yahoo.com, which belongs to view 2. The 25th entry is for a new password for the domain netflix.com (also belonging to view 2), and is followed by a 26th entry which indicates that a backup was made (created or updated) for view 2. Since the backup, the yahoo.com password has been updated (as mentioned, some embodiments treat this as two entries, to delete the old password and add a new password), and new passwords have been added for usbank.com (which belongs to view 1, a more restrictive view for financial information) and for espn.com. These transactions also indicate, in some embodiments, the source of the updates (e.g., from user entry or synchronization with another related device).

The keychain backup module 1840 of some embodiments is responsible for communicating with the backup storage, sending data to the backup storage, and retrieving backed up data from the backup storage. The local storage 1845 is representative of the various local non-volatile and/or volatile memory that stores the keychain data, item keys, public/private key pairs of the device 1800, public keys of the related devices, etc.

As shown in FIG. 17, the process 1700 begins by receiving (at 1705) a request to update an existing backup that is accessible by the device. In some embodiments, the device maintains (or can request) a list of the backups to which it has access (either with or without requesting an escrow object). In addition, some embodiments require that the device updating the backup be the device that initially created the backup. As such, the list of some such embodiments specifies either the device that created the backup or at least whether the particular device created the backup. The second stage 1810 of FIG. 18 illustrates that the device 1800 receives a request 1855 to update the backup for view 2.

The process 1700 then retrieves (at 1710) the transaction log of synchronization activity, and uses (at 1715) the transaction log to identify changes to make to the backup. As shown in the first stage 1805 of FIG. 18, this log includes keychain synchronization activity, backup activity, etc. The transaction log of some embodiments is ordered such that all activity after the most recent backup for a particular view are the transactions (additions, removals, etc. of keychain data) that come after that backup in the log. All transactions prior to the most recent backup will already be reflected in the existing stored backup.

Next, the process retrieves (at 1720) the stored backup keybag and master recovery object encrypted with the public key of the device performing the update. In some embodiments, the device does not need to retrieve the entire set of backup data items, as most of these items will not change. However, in embodiments in which the backup keybag is encrypted together, the keybag is retrieved so that it can be updated and re-encrypted. As the backup is one that the device is allowed to access (and in some cases, created), a master recovery object exists with the backup that can be decrypted with the private key of the device (and thus no escrow object is required).

The third stage 1815 of FIG. 18 illustrates that (i) the sync engine 1835 identifies the changes to be made to the backup for view 2 and informs the keychain backup module 1840 of these changes, and (ii) the keychain backup module retrieves from the backup storage 1870 the backup keybag 1860 for view 2 along with the master recovery object 1865 for the view 2 backup that is encrypted with the public key of device 1800. The new backup items include a modification (i.e., remove and then add) of the yahoo.com password and a new espn.com password. Because the backup is for view 2, the new password that the user entered for usbank.com is not part of the information that will be added to the updated backup.

Returning to FIG. 17, the process 1700 next decrypts (at 1725) the master recovery object (to reveal the master recovery key) using the private key of the device on which the process is performed, and subsequently uses the decrypted master recovery key to decrypt the backup keybag (i.e., as shown in FIG. 13 above, without the need to access an escrow object. This enables the device to subsequently add or remove item keys from the backup keybag as part of the update.

As such, the process next removes (at 1730) modified or deleted items from the backup and adds new items to the backup. In some embodiments, the transaction log enables the device to avoid having to retrieve the entire backup and re-send the backup to storage. Instead, the device updating the backup specifically adds the new keychain items (for the backed up view) to the backup storage as part of the keychain, and removes the outdated keychain items from the backup. In some embodiments, the modified data items involve one of each operation; a first operation to remove the existing keychain data item and a second operation to add the modified item as a new data item.

The process also adds (at 1735) item keys for the new items to the keybag and removes item keys that are no longer needed. For each new item, the item is encrypted with an item key in some embodiments, and the corresponding decryption key (e.g., the private key) must be accessible as part of the keybag. Similarly, if an item is being removed from the backup, then the item key used to decrypt that data item is no longer needed in the backup keybag. Thus, the changes made to the backup keybag mirror those made to the backup keychain data in some embodiments.

Finally, the process 1700 encrypts (at 1740) the updated keybag with the master recovery key and stores the encrypted keybag in the backup storage location. Because the device can decrypt the master recovery object and use the same public master recovery key (which can be generated from the recovered private key or the seed data) to re-encrypt the backup keybag, no modifications need to be made to the master recovery objects stored with the backup. However, if one of the devices has been removed from the view (because it is no longer part of the set of related devices, or no longer meets other criteria for participation in the view), some embodiments remove the master recovery object for that device from the backup storage.

Returning to FIG. 18, the fourth stage 1820 illustrates that the keychain backup module 1840 retrieves the two new passwords 1872 (for yahoo.com and for espn.com) from the local storage 1845 on the device 1800, and also retrieves the password encryption keys 1875 (i.e., the item keys for those two data items). These new keys are added to the decrypted keybag (decryption not shown), and the old item key for the yahoo.com password is removed from this keybag. The new keybag can then be encrypted by the keybag encryptor 1880 (e.g., an asymmetric encryption function, such as those described above). In some embodiments, the same item key is used for the modified password as was used for the old version. In this case, when the only updates entail changes to the backup items, decryption and re-encryption of the keybag may not be necessary.

In the fifth stage 1825, the keychain backup module 1840 (i) updates the backup data in the backup storage 1870 by sending updates 1885 specifying to remove the old yahoo.com password and providing the new (encrypted) yahoo.com and espn.com passwords retrieved from storage and (ii) sends to the backup storage 1870 the new encrypted keybag 1890 that includes the data item keys for the new passwords. Thus, the backup stored in the backup storage is now updated, and the master recovery objects (and escrow objects registered with the secure escrow service) did not require updating. The sixth stage 1830 illustrates that the transaction log 1850 has been updated to indicate (as entry 30) that view 2 has been backed up.

In this example, the set of data items for a backup has changed. In some cases, however, the devices that should be able to recover a backup will change. For instance, a user might change a device from having a secure passcode to not having a passcode at all, which would result in the device being removed from a view that requires a passcode for participation. Similarly, a user might upgrade her phone, thereby ceasing to use a previous phone. In some embodiments, when one of the other devices detects this change, the device modifies the master recovery objects stored in the backup storage to remove the object for the device that is no longer allowed to access the backup.

When a device is no longer in use, some embodiments remove the escrow object for the decommissioned device. Different embodiments may use different heuristics to decide when to remove an escrow object from the secure escrow service. If this escrow object is removed, then the master recovery object stored with the backup need not be deleted, as there will be no way to access the private key that decrypts the master recovery object. In addition, whenever a device has its passcode changed, a new escrow object is created for that device and, in some embodiments, the old escrow object is removed.

V. Storing and Escrowing Application-Specific Keys

As mentioned above, the items stored in the backup may include various different types of data, such as usernames and passwords, Wi-Fi network names and passwords, account numbers (e.g., bank accounts, credit card accounts, etc.), cryptographic keys, files or other data blobs, etc. One example of cryptographic keys stored as keychain items and therefore backed up are application-specific cryptographic keys, also referred to as service keys or service identities. These application-specific keys enable access to application-related data stored with a cloud service, via a hierarchy of nested keys. That is, for each application on a device (or each of a subset of the applications on the device), the set of data items stored in the backup includes an application-specific private key (e.g., a photos application key).

Figure 19:
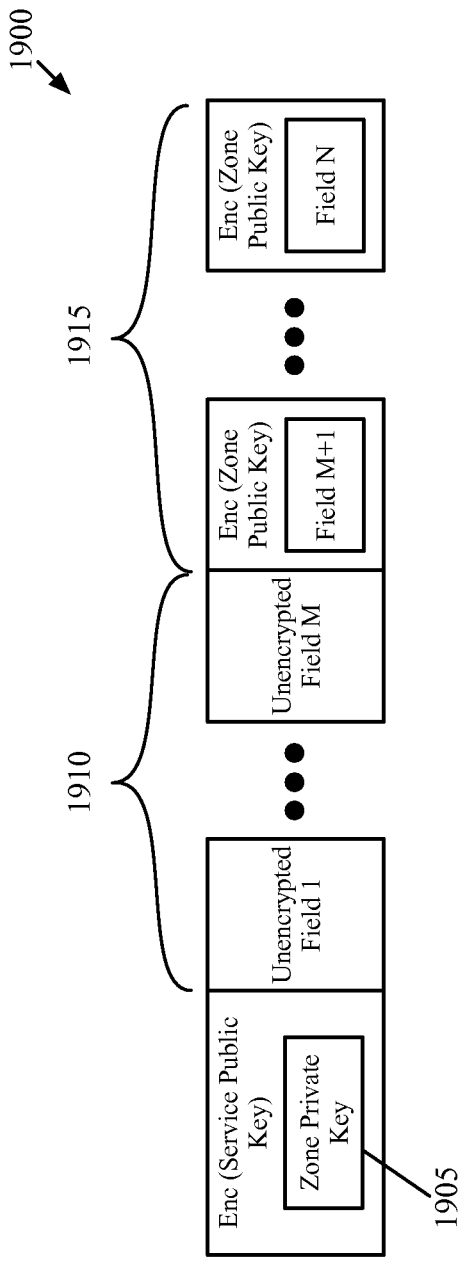
FIGS. 19 and 20 illustrate a data protections structure in which an application-specific private key is used to access data stored in a tree of keys and data fields, which ultimately allows access to the application data itself.
Figure 20:
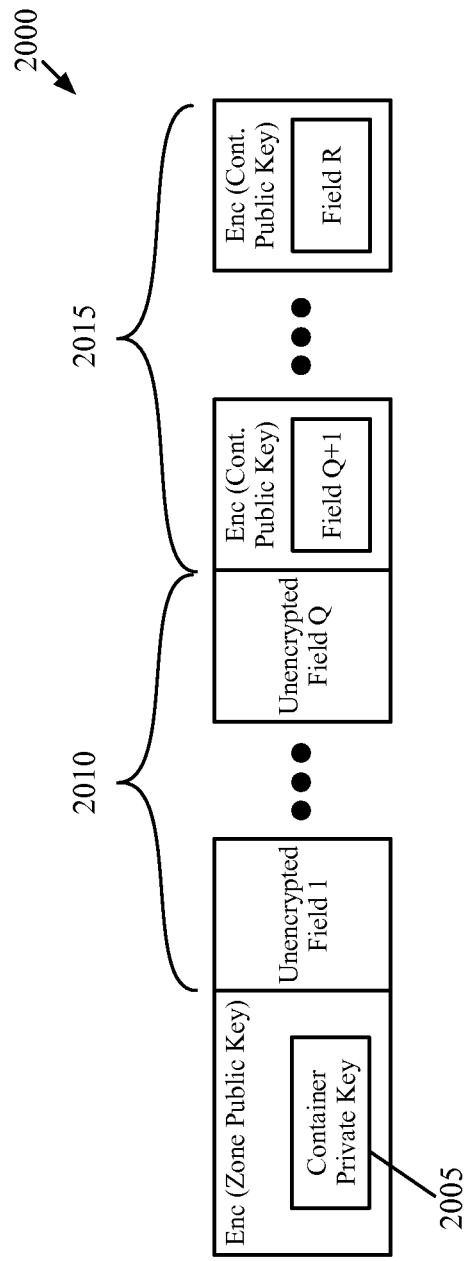

The application-specific private key is used to access data stored in a tree of keys and data fields, which ultimately allows access to the application data itself. This protection structure is shown in FIGS. 19 and 20. FIG. 19 illustrates a container structure 1900 that is stored in a centralized repository (e.g., a cloud storage), and is available for a device to download in some embodiments. The container structure 1900 includes its own private key 1905 (or seed data used to generate the private key) encrypted with the application-specific public key. Thus, access to this container private key requires possession of the application-specific private key that is synchronized as a keychain data item. The container structure 1900, which represents a high-level overview of the application, includes both a set of unencrypted fields 1910 (Field_1-Field_M) which do not require any keys to access, as well as a set of fields 1915 (Field_M+1-Field_N) which are each encrypted with the container public key 1905 (and therefore require possession of the container private key for access).

In addition, the container public key is used to encrypt a zone private key 2005, which is part of a zone structure

2000. Thus, access to the zone structure requires access to the container private key 1905, which in turn requires access to the application-specific service key. As with the container structure 1900, the zone structure 2000 includes several unencrypted fields 2010 (Field 1-Field Q) and several fields 2015 (Field Q+1-Field R) encrypted with the zone key. While the container represents a high-level overview of an application, a zone represents a specific database or table within the container in some embodiments. For instance, a zone could represent a set of photos associated with an application, with each photo represented by a record (and the records pointed to by the zone).

Each of the records referenced by the zone, in some embodiments, could include a key to a specific piece of application data (e.g., a specific photo). Each record, in some embodiments, has a key encrypted with its zone public key, and thus requires the zone private key to access. The record is structured like the container and the zone, with unencrypted fields and encrypted fields. For example, the fields for a photo record could store the title, location, timestamp, etc. for a photo, as well as a key that will actually unlock the photo. In some embodiments, the record key unlocked by the zone key is a symmetric key, rather than the private key of a public/private key pair.

As mentioned, in some embodiments, the application-specific keys are among the data items stored in the backup, which is recoverable via the recovery keys stored with the secure escrow service. Thus, even if the application data (e.g., a user's photos and videos, files, etc.) are stored in the cloud storage, the owner of the cloud storage (or an attacker acting through the owner) is unable to access these files, because the application-specific keys which control access to the hierarchy of keys stored in the containers and zones are not available. Even if the owner of the cloud services is the same as the owner of the secure escrow service, a brute force attempt to access the recovery key will be protected by the HSMs and the limited number of attempts allowed by the HSMs. In addition, so long as the user can remember one of her device passwords, the application-specific data will not be lost (because the user can recover the backed-up keychain data, including the application-specific keys, with any one of the device passwords as described above).

Some embodiments, either in addition to or as an alternative to storing the application-specific keys with the backup data items (and synchronizing these keys between devices using the synchronization process), store the application-specific keys with the secure escrow service. In some embodiments, when the user stores the application data (e.g., the containers, zones, and data records) with the centralized cloud service, the cloud service generates and stores the equivalent of an escrow key to register the application-specific keys with the secure escrow service. In this case, the application-specific keys are the data being stored in the escrow service (comparable to the private recovery key 825 in FIG. 8 above) while the cloud service-generated key protects this data (comparable to the public escrow key 815). With this system, the user is ensured that her application-specific data (e.g., photos, etc.) will not be lost. When the user acquires a new device using such a system, upon the user proving the right to access the application-specific data (by, e.g., entering the cloud services password on the device), in some embodiments the cloud services automatically retrieve the application-specific keys from the escrow service in order to enable the user to access the application-specific data stored in the cloud services.

In some embodiments, once the user registers device-specific recovery keys (accessible via the device passcode) with the secure escrow service, the user may have the option to securely delete any of the application-specific keys registered with the escrow service. Because the application-specific keys will now be stored in the backups and synchronized between devices as data items, the user may not want the application-specific keys to stay registered with the secure escrow service as well. When the application-specific keys are securely deleted from the escrow service, the encrypted application-specific data stored in cloud services is only accessible via either the keychain or the backups. This data only the user has access to, and therefore the owner of the cloud service has no ability to access the application-specific data.

In some embodiments, the secure escrow service uses different sets of secure HSMs (with different public/private key pairs) to store (i) the application-specific keys and (ii) the private device-specific recovery keys. In some embodiments, the machines that receive requests to access the escrow data identify the type of request (e.g., whether for an application-specific key, a device-specific key, or a different type of key) and route the request to the appropriate set of HSMs. In some embodiments, the requests include strings that are used to perform this routing.

VI. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

A. Mobile Device

Figure 21:
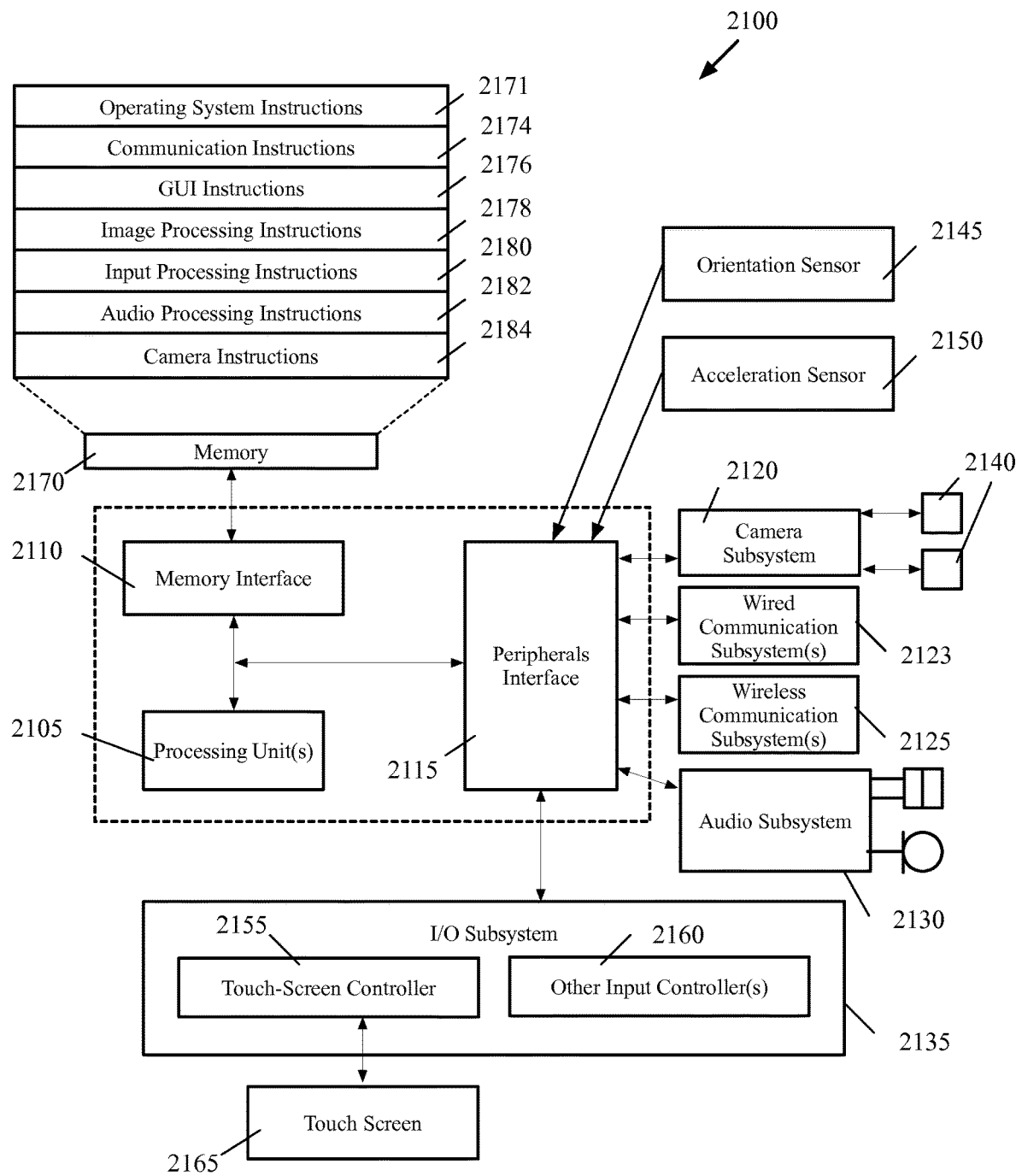
FIG. 21 illustrates an example of an architecture of a mobile computing device with which some embodiments are implemented.

The user data sharing of some embodiments occurs on mobile devices, such as smart phones (e.g., iPhones®) and tablets (e.g., iPads®). FIG. 21 is an example of an architecture 2100 of such a mobile computing device. As shown, the mobile computing device 2100 includes one or more processing units 2105, a memory interface 2110 and a peripherals interface 2115.

The peripherals interface 2115 is coupled to various sensors and subsystems, including a camera subsystem 2120, a wired communication subsystem(s) 2123, a wireless communication subsystem(s) 2125, an audio subsystem 2130, an I/O subsystem 2135, etc. The peripherals interface 2115 enables communication between the processing units 2105 and various peripherals. For example, an orientation sensor 2145 (e.g., a gyroscope) and an acceleration sensor 2150 (e.g., an accelerometer) is coupled to the peripherals interface 2115 to facilitate orientation and acceleration functions.

The camera subsystem 2120 is coupled to one or more optical sensors 2140 (e.g., a charged coupled device (CCD) optical sensor, a complementary metal-oxide-semiconductor (CMOS) optical sensor, etc.). The camera subsystem 2120 coupled with the optical sensors 2140 facilitates camera functions, such as image and/or video data capturing. The wired communication subsystem 2123 and wireless communication subsystem 2125 serve to facilitate communication functions.

In some embodiments, the wireless communication subsystem 2125 includes radio frequency receivers and transmitters, and optical receivers and transmitters (not shown in FIG. 21). These receivers and transmitters of some embodiments are implemented to operate over one or more communication networks such as a Global System for Mobile communication (GSM) network, a Wi-Fi network, a Bluetooth network, etc. The audio subsystem 2130 is coupled to a speaker to output audio (e.g., to output voice navigation instructions). Additionally, the audio subsystem 2130 is coupled to a microphone to facilitate voice-enabled functions in some embodiments.

The I/O subsystem 2135 involves the transfer between input/output peripheral devices, such as a display, a touch screen, etc., and the data bus of the processing units 2105 through the peripherals interface 2115. The I/O subsystem 2135 includes a touch-screen controller 2155 and other input controllers 2160 to facilitate the transfer between input/output peripheral devices and the data bus of the processing units 2105. As shown, the touch-screen controller 2155 is coupled to a touch screen 2165. The touch-screen controller 2155 detects contact and movement on the touch screen 2165 using any of multiple touch sensitivity technologies. The other input controllers 2160 are coupled to other input/control devices, such as one or more buttons. Some embodiments include a near-touch sensitive screen and a corresponding controller that can detect near-touch interactions instead of or in addition to touch interactions.

The memory interface 2110 is coupled to memory 2170. In some embodiments, the memory 2170 includes volatile memory (e.g., high-speed random access memory), non-volatile memory (e.g., flash memory), a combination of volatile and non-volatile memory, and/or any other type of memory. As illustrated in FIG. 21, the memory 2170 stores an operating system (OS) 2171. The OS 2171 includes instructions for handling basic system services and for performing hardware dependent tasks.

The memory 2170 also includes communication instructions 2174 to facilitate communicating with one or more additional devices (e.g., for peer-to-peer data sharing, or to connect to a server through the Internet for cloud-based data sharing); graphical user interface instructions 2176 to facilitate graphic user interface processing; image processing instructions 2178 to facilitate image-related processing and functions; input processing instructions 2180 to facilitate input-related (e.g., touch input) processes and functions; audio processing instructions 2182 to facilitate audio-related processes and functions; and camera instructions 2184 to facilitate camera-related processes and functions. The instructions described above are merely exemplary and the memory 2170 includes additional and/or other instructions in some embodiments. For instance, the memory for a smartphone may include phone instructions to facilitate phone-related processes and functions. The above-identified instructions need not be implemented as separate software programs or modules. Various functions of the mobile computing device can be implemented in hardware and/or in software, including in one or more signal processing and/or application specific integrated circuits.

While the components illustrated in FIG. 21 are shown as separate components, one of ordinary skill in the art will recognize that two or more components may be integrated into one or more integrated circuits. In addition, two or more components may be coupled together by one or more communication buses or signal lines. Also, while many of the functions have been described as being performed by one component, one of ordinary skill in the art will realize that the functions described with respect to FIG. 21 may be split into two or more integrated circuits.

B. Computer System

Figure 22:
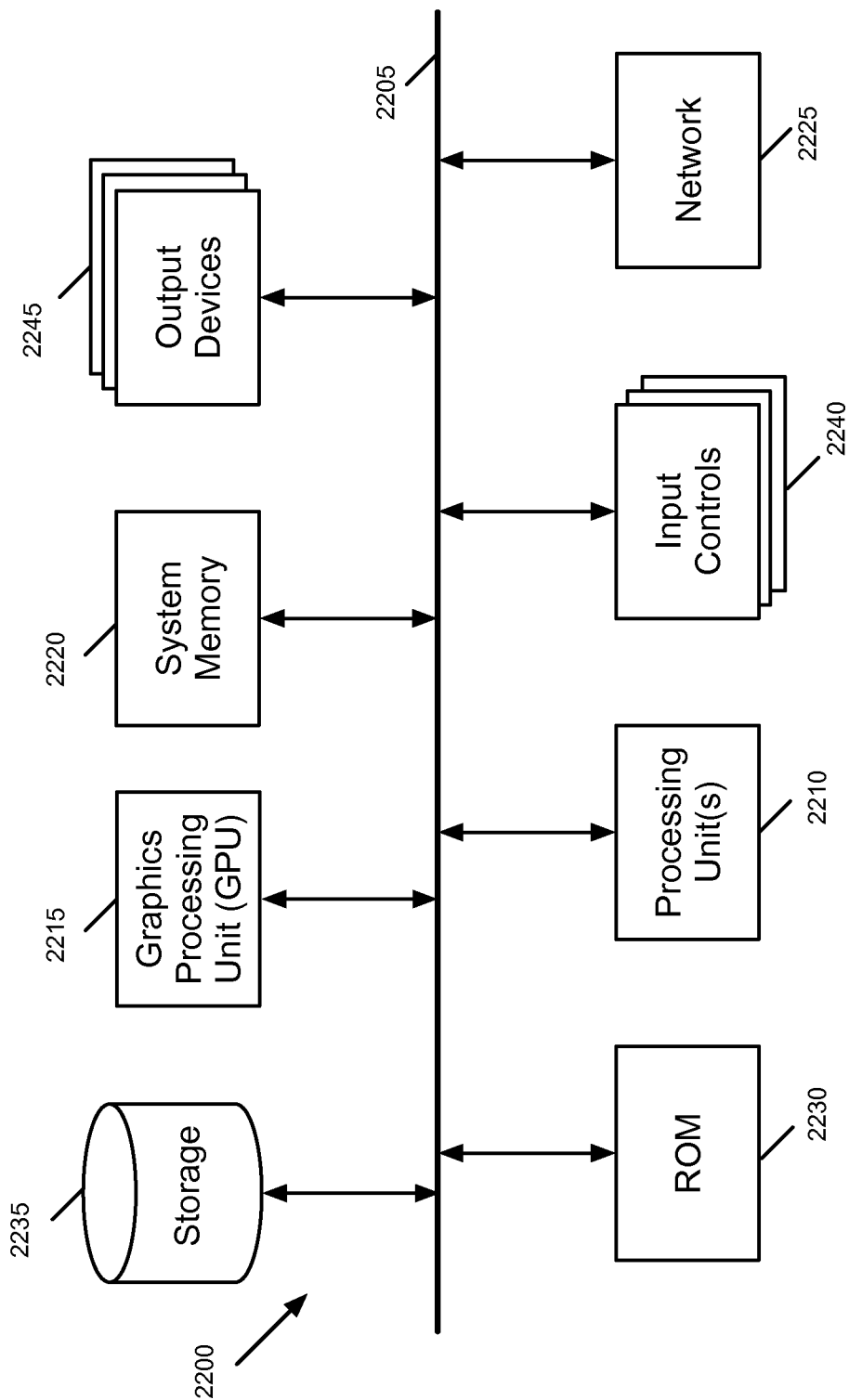
FIG. 22 conceptually illustrates another example of an electronic system with which some embodiments of the invention are implemented.

FIG. 22 conceptually illustrates another example of an electronic system 2200 with which some embodiments of the invention are implemented. The electronic system 2200 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 2200 includes a bus 2205, processing unit(s) 2210, a graphics processing unit (GPU) 2215, a system memory 2220, a network 2225, a read-only memory 2230, a permanent storage device 2235, input devices 2240, and output devices 2245.

The bus 2205 collectively represents all system, peripheral, and chipset buses that communicatively connect the numerous internal devices of the electronic system 2200. For instance, the bus 2205 communicatively connects the processing unit(s) 2210 with the read-only memory 2230, the GPU 2215, the system memory 2220, and the permanent storage device 2235.

From these various memory units, the processing unit(s) 2210 retrieves instructions to execute and data to process in order to execute the processes of the invention. The processing unit(s) may be a single processor or a multi-core processor in different embodiments. Some instructions are passed to and executed by the GPU 2215. The GPU 2215 can offload various computations or complement the image processing provided by the processing unit(s) 2210. In some embodiments, such functionality can be provided using CoreImage's kernel shading language.

The read-only-memory (ROM) 2230 stores static data and instructions that are needed by the processing unit(s) 2210 and other modules of the electronic system. The permanent storage device 2235, on the other hand, is a read-and-write memory device. This device is a non-volatile memory unit that stores instructions and data even when the electronic system 2200 is off. Some embodiments of the invention use a mass-storage device (such as a magnetic or optical disk and its corresponding disk drive, integrated flash memory) as the permanent storage device 2235.

Other embodiments use a removable storage device (such as a floppy disk, flash memory device, etc., and its corresponding drive) as the permanent storage device. Like the permanent storage device 2235, the system memory 2220 is a read-and-write memory device. However, unlike storage device 2235, the system memory 2220 is a volatile read-and-write memory, such a random access memory. The system memory 2220 stores some of the instructions and data that the processor needs at runtime. In some embodiments, the invention's processes are stored in the system memory 2220, the permanent storage device 2235, and/or the read-only memory 2230. For example, the various memory units include instructions for processing multimedia clips in accordance with some embodiments. From these various memory units, the processing unit(s) 2210 retrieves instructions to execute and data to process in order to execute the processes of some embodiments.

The bus 2205 also connects to the input and output devices 2240 and 2245. The input devices 2240 enable the user to communicate information and select commands to the electronic system. The input devices 2240 include alphanumeric keyboards and pointing devices (also called "cursor control devices"), cameras (e.g., webcams), microphones or similar devices for receiving voice commands, etc. The output devices 2245 display images generated by the electronic system or otherwise output data. The output devices 2245 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 22, bus 2205 also couples electronic system 2200 to a network 2225 through a network adapter (not shown). In this manner, the computer can be a part of a network of computers (such as a local area network ("LAN"), a wide area network ("WAN"), or an Intranet), or a network of networks, such as the Internet. Any or all components of electronic system 2200 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. For instance, a number of the figures (including FIGS. 4, 7, 10, 12, 14, 15, and 17) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

The invention claimed is:

1. A method for recovering a set of backup data for installation on a device, the method-comprising:
receiving input of user-entered data used to generate a public/private escrow key pair associated with a particular device of a set of related devices;
transmitting data that proves possession of the private escrow key to a set of secure servers that store a plurality of secure escrow objects for the set of related devices, each of the secure escrow objects comprising a private recovery key of a different device encrypted with a public key of the secure servers and the public escrow key associated with the device;
when the user-entered data that is used to generate the public/private escrow key pair is correct, receiving the private recovery key of the particular device from the set of secure servers; and
using the received private recovery key to access one of a plurality of master recovery objects stored with the backup data, each of the master recovery objects comprising a master recovery key for accessing the backup data encrypted with a public recovery key of a different one of the related devices.

2. The method of claim 1, wherein receiving the private recovery key comprises:
receiving a recovery object comprising the private recovery key encrypted with the public escrow key; and
decrypting the recovery object with the private escrow key to recover the private recovery key.

3. The method of claim 1, wherein the device is one of the related devices after re-installation of an operating system of the device.

4. The method of claim 1, wherein receiving input of the user-entered data comprises input of a device passcode for the device, the method further comprising:
identifying the devices in the set of related devices; and automatically selecting one of the related devices most likely to have a same passcode as the device passcode input for the device according to a set of heuristics, wherein the private escrow key is identified as the escrow key for decrypting a particular one of the secure escrow objects corresponding to the automatically selected device.

5. The method of claim 1, wherein transmitting the data that proves possession of the private escrow key comprises:

setting up a secure channel with the set of secure servers; and transmitting the data to the set of secure servers via the secure channel, wherein the private recovery key is received from the set of secure servers via the secure channel, wherein the set of secure servers and the secure channel prevent a centralized entity that stores the backups from being able to acquire the private recovery key.

6. The method of claim 1, wherein the set of secure servers comprises a set of hardware security modules that store the private keys of the secure servers and a set of proxy servers that store the secure escrow objects, wherein the set of hardware security modules performs decryption of the secure escrow object.

7. The method of claim 1, wherein:

when the user-entered data that is used to generate the public/private escrow key pair is incorrect, the set of secure servers decrements a number of available attempts to access a particular secure escrow object that the device attempted to access; and when the number of available attempts reaches zero, the particular secure escrow object is made inaccessible.

8. A non-transitory machine readable medium storing a program which when executed by at least one processing unit recovers a set of backup data for installation on a device, the program comprising sets of instructions for:

receiving input of user-entered data used to generate a public/private escrow key pair associated with a particular device of a set of related devices;

transmitting data that proves possession of the private escrow key to a set of secure servers that store a plurality of secure escrow objects for the set of related devices, each of the secure escrow objects comprising a private recovery key of a different device encrypted with a public key of the secure servers and the public escrow key associated with the device;

when the user-entered data that is used to generate the public/private escrow key pair is correct, receiving the private recovery key of the particular device from the set of secure servers; and using the received private recovery key to access one of a plurality of master recovery objects stored with the backup data, each of the master recovery objects comprising a master recovery key for accessing the backup data encrypted with a public recovery key of a different one of the related devices.

9. The non-transitory machine readable medium of claim 8, wherein the set of instructions for receiving the private recovery key comprises sets of instructions for:

receiving a recovery object comprising the private recovery key encrypted with the public escrow key; and decrypting the recovery object with the private escrow key to recover the private recovery key.

10. The non-transitory machine readable medium of claim 8, wherein the device is one of the related devices after re-installation of an operating system of the device.

11. The non-transitory machine readable medium of claim 8, wherein the input of the user-entered data comprises input of a device passcode for the device, the program further comprising sets of instructions for:

identifying the devices in the set of related devices; and automatically selecting one of the related devices most likely to have a same passcode as the device passcode input for the device according to a set of heuristics, wherein the private escrow key is identified as the escrow key for decrypting a particular one of the secure escrow objects corresponding to the automatically selected device.

12. The non-transitory machine readable medium of claim 8, wherein the set of instructions for transmitting the data that proves possession of the private escrow key comprises sets of instructions for:

setting up a secure channel with the set of secure servers; and transmitting the data to the set of secure servers via the secure channel, wherein the private recovery key is received from the set of secure servers via the secure channel, wherein the set of secure servers and the secure channel prevent a centralized entity that stores the backups from being able to acquire the private recovery key.

13. The non-transitory machine readable medium of claim 8, wherein the set of secure servers comprises a set of hardware security modules that store the private keys of the secure servers and a set of proxy servers that store the secure escrow objects, wherein the set of hardware security modules performs the decryption of the secure escrow object.

14. The non-transitory machine readable medium of claim 8, wherein:

when the user-entered data that is used to generate the public/private escrow key pair is incorrect, the set of secure servers decrements a number of available attempts to access a particular secure escrow object that the device attempted to access; and when the number of available attempts reaches zero, the particular secure escrow object is made inaccessible.

15. A device comprising:

a set of processing units; and a non-transitory machine readable medium storing a program which when executed by at least one of the processing units recovers a set of backup data for installation on the device, wherein the backup data is stored for a set of related devices by one of the related devices, the program comprising sets of instructions for:

receiving input of user-entered data used to generate a public/private escrow key pair associated with a particular one of the related devices;

transmitting data that proves possession of the private escrow key to a set of secure servers that store a plurality of secure escrow objects for the set of related devices, each of the secure escrow objects comprising a private recovery key of a different device encrypted with a public key of the secure servers and the public escrow key associated with the device;

when the user-entered data that is used to generate the public/private escrow key pair is correct, receiving the private recovery key of the particular device from the set of secure servers; and using the received private recovery key to access one of a plurality of master recovery objects stored with the backup data, each of the master recovery objects comprising a master recovery key for accessing the backup data encrypted with a public recovery key of a different one of the related devices.

16. The device of claim 15, wherein the set of instructions for receiving the private recovery key comprises sets of instructions for:
   receiving a recovery object comprising the private recovery key encrypted with the public escrow key; and
   decrypting the recovery object with the private escrow key to recover the private recovery key.

17. The device of claim 15, wherein the input of the user-entered data comprises input of a device passcode for the device, the program further comprising sets of instructions for:
   identifying the devices in the set of related devices; and
   automatically selecting one of the related devices most likely to have a same passcode as the device passcode input for the device according to a set of heuristics,
   wherein the private escrow key is identified as the escrow key for decrypting a particular one of the secure escrow objects corresponding to the automatically selected device.

18. The device of claim 15, wherein the set of instructions for transmitting the data that proves possession of the private escrow key comprises sets of instructions for:
   setting up a secure channel with the set of secure servers; and
   transmitting the data to the set of secure servers via the secure channel,
   wherein the private recovery key is received from the set of secure servers via the secure channel, wherein the set of secure servers and the secure channel prevent a centralized entity that stores the backups from being able to acquire the private recovery key.

19. The device of claim 15, wherein the set of secure servers comprises a set of hardware security modules that store the private keys of the secure servers and a set of proxy servers that store the secure escrow objects, wherein the set of hardware security modules performs decryption of the secure escrow object.

20. The device of claim 15, wherein:
   when the user-entered data that is used to generate the public/private escrow key pair is incorrect, the set of secure servers decrements a number of available attempts to access a particular secure escrow object that the device attempted to access; and
   when the number of available attempts reaches zero, the particular secure escrow object is made inaccessible.

* * * * *